(12) United States Patent
Chaudhari et al.

(10) Patent No.: US 11,727,364 B2
(45) Date of Patent: Aug. 15, 2023

(54) METHOD AND SYSTEM FOR FACILITATING SCHEDULED TRANSACTIONS

(71) Applicant: MASTERCARD INTERNATIONAL INCORPORATED, Purchase, NY (US)

(72) Inventors: Ritesh Chaudhari, Pune (IN); Ashish Dhande, Pune (IN); Arpan Beohar, Pune (IN); Chetan Bhalerao, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/090,988

(22) Filed: Nov. 6, 2020

(65) Prior Publication Data

US 2021/0174313 A1   Jun. 10, 2021

(30) Foreign Application Priority Data

Dec. 6, 2019   (IN) .............................. 201921050344

(51) Int. Cl.
| | |
|---|---|
| *G06Q 20/02* | (2012.01) |
| *G06Q 20/38* | (2012.01) |
| *H04L 9/40* | (2022.01) |
| *G06Q 40/02* | (2023.01) |
| *G06Q 20/08* | (2012.01) |
| *G06Q 20/40* | (2012.01) |

(52) U.S. Cl.
CPC ........... *G06Q 20/02* (2013.01); *G06Q 20/085* (2013.01); *G06Q 20/385* (2013.01); *G06Q 20/401* (2013.01); *G06Q 40/02* (2013.01); *H04L 63/0838* (2013.01)

(58) Field of Classification Search
None
See application file for complete search history.

(56) References Cited

U.S. PATENT DOCUMENTS

| | | | |
|---|---|---|---|
| 2016/0210623 A1* | 7/2016 | Voege | G06Q 20/322 |
| 2018/0130045 A1* | 5/2018 | Lee | G06Q 20/3227 |
| 2021/0174352 A1* | 6/2021 | Kenney | G06Q 20/28 |

* cited by examiner

*Primary Examiner* — Scott S Trotter
*Assistant Examiner* — Amit Patel
(74) *Attorney, Agent, or Firm* — Jordan IP Law, LLC

(57) ABSTRACT

A method and system for facilitating payment transactions is provided. A server receives a transaction scheduling request from a first user device for scheduling a payment transaction from a first payment account associated with a first user to a second payment account associated with a second user. The payment transaction is scheduled for a first time instance. Upon successful scheduling of the payment transaction, a one-time password for authenticating the scheduled payment transaction is communicated to the first user. The server receives a payment transaction request corresponding to the scheduled payment transaction from a second user device associated with the second user to approve the scheduled payment transaction. The scheduled payment transaction is approved upon successfully receiving the one-time password from the second user device.

17 Claims, 14 Drawing Sheets

METHOD AND SYSTEM FOR FACILITATING SCHEDULED TRANSACTIONS

CROSS-REFERENCE TO RELATED APPLICATIONS

The present application claims priority to India Patent Application No. 201921050344 (filed on Dec. 6, 2019), which is hereby incorporated by reference in its entirety.

BACKGROUND

Field of the Disclosure

Various embodiments of the disclosure relate generally to transactions. More specifically, various embodiments of the disclosure relate to a method and a system for facilitating scheduled transactions.

Description of the Related Art

Nowadays, users prefer digital transactions over cash transactions for making payments as the digital transactions have become simpler and easier with technological advancements. While the digital transactions are seen as an evolution over the cash transactions, the digital transactions are time consuming. Also, for initiating the digital transactions, electronic devices, such as a smart phone or a point-of-sale (POS) device, are required. Since the digital transactions are time consuming, for small amount of transactions, the users prefer cash instead of performing the digital transactions.

When a user wishes to perform the transaction using a transaction card, the user has to always carry the transaction card. The user has to further provide a personal identification number (PIN) for processing of the transaction performed using the transaction card. A merchant, with whom the transaction is to be performed, has to install the POS device for accepting payments using the transaction card. The merchants have to further pay maintenance charges annually for the POS device. To overcome various card-based payment methods, transactions via quick response (QR) codes, unified payment interface (UPI) links, or the like have been introduced. However, the user still has to carry a mobile phone for performing the transaction using the QR codes, UPI links, or the like, which are still time consuming. Moreover, there should be internet connectivity in the mobile phone of the user for initiating such transaction. In one specific example, when the user is a regular client of the merchant and is involved in a daily transaction for purchasing products and/or services from the merchant, these techniques result to be time consuming and restricted due to hardware requirements. As a result, the user prefers to pay cash instead of the digital transaction. However, the idea of a digital world demands the users to go cashless and perform digital transactions worldwide.

In light of foregoing, there exists a need for a solution that solves the abovementioned problems and provides a seamless mechanism for performing digital transactions.

SUMMARY

In an embodiment of the disclosure, a method for facilitating payment transactions is provided. A transaction scheduling request is received by a server from a first user device. The transaction scheduling request may be received at a first time instance for scheduling a payment transaction from a first payment account associated with a first user to a second payment account associated with a second user. The payment transaction may be scheduled for a second time instance that occurs at a later time than the first time instance. Based on successful processing of the transaction scheduling request, a first one-time password is communicated to the first user. The first one-time password may be communicated for initiating the scheduled payment transaction. A payment transaction request corresponding to the scheduled payment transaction is received by the server from a second user device associated with the second user. The payment transaction request may include at least the first one-time password. A verification request is communicated by the server to an issuer. The verification request may be communicated for verifying the first one-time password. Based on successful verification of the first one-time password, the payment transaction request is processed by the server.

In another embodiment of the disclosure, a system for facilitating payment transactions is provided. The system includes a server that is configured to receive a transaction scheduling request from a first user device. The transaction scheduling request may be received at a first time instance for scheduling a payment transaction from a first payment account associated with a first user to a second payment account associated with a second user. The payment transaction may be scheduled for a second time instance that occurs at a later time than the first time instance. Based on successful processing of the transaction scheduling request, a first one-time password is communicated to the first user. The first one-time password may be communicated for initiating the scheduled payment transaction. The server is further configured to receive a payment transaction request corresponding to the scheduled payment transaction from a second user device associated with the second user. The payment transaction request may be received at the second time instance. The payment transaction request may include at least the first one-time password. The server is further configured to communicate a verification request to an issuer. The verification request may be communicated for verifying the first one-time password. Based on successful verification of the first one-time password, the server is further configured to process the payment transaction request.

In another embodiment of the disclosure, a method for facilitating payment transactions is provided. A transaction scheduling request is received by a server from a first user device. The transaction scheduling request may be received at a first time instance for scheduling a payment transaction from a first payment account associated with a first user to a second payment account. The payment transaction may be scheduled for a second time instance that occurs at a later time than the first time instance. The second payment account may be associated with a second user and a second user device. The payment transaction may be scheduled by the server from the first payment account to the second payment account based on successful authentication of the first user. The successful authentication of the first user may be performed using a first authentication method. A first one-time password may be generated by the server for authenticating the scheduled payment transaction upon successfully scheduling the payment transaction from the first payment account to the second payment account. The first one-time password may be further communicated to the first user device. A payment transaction request may be received by the server from the second user device at the second time instance. The payment transaction request may be received to approve the scheduled payment transaction. The scheduled payment transaction may be approved by the server upon successfully receiving the first one-time password from the second user device.

BRIEF DESCRIPTION OF DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the disclosure are illustrated by way of example, and not limited by the appended figures, in which like references indicate similar elements, and in which.

Figure 1:
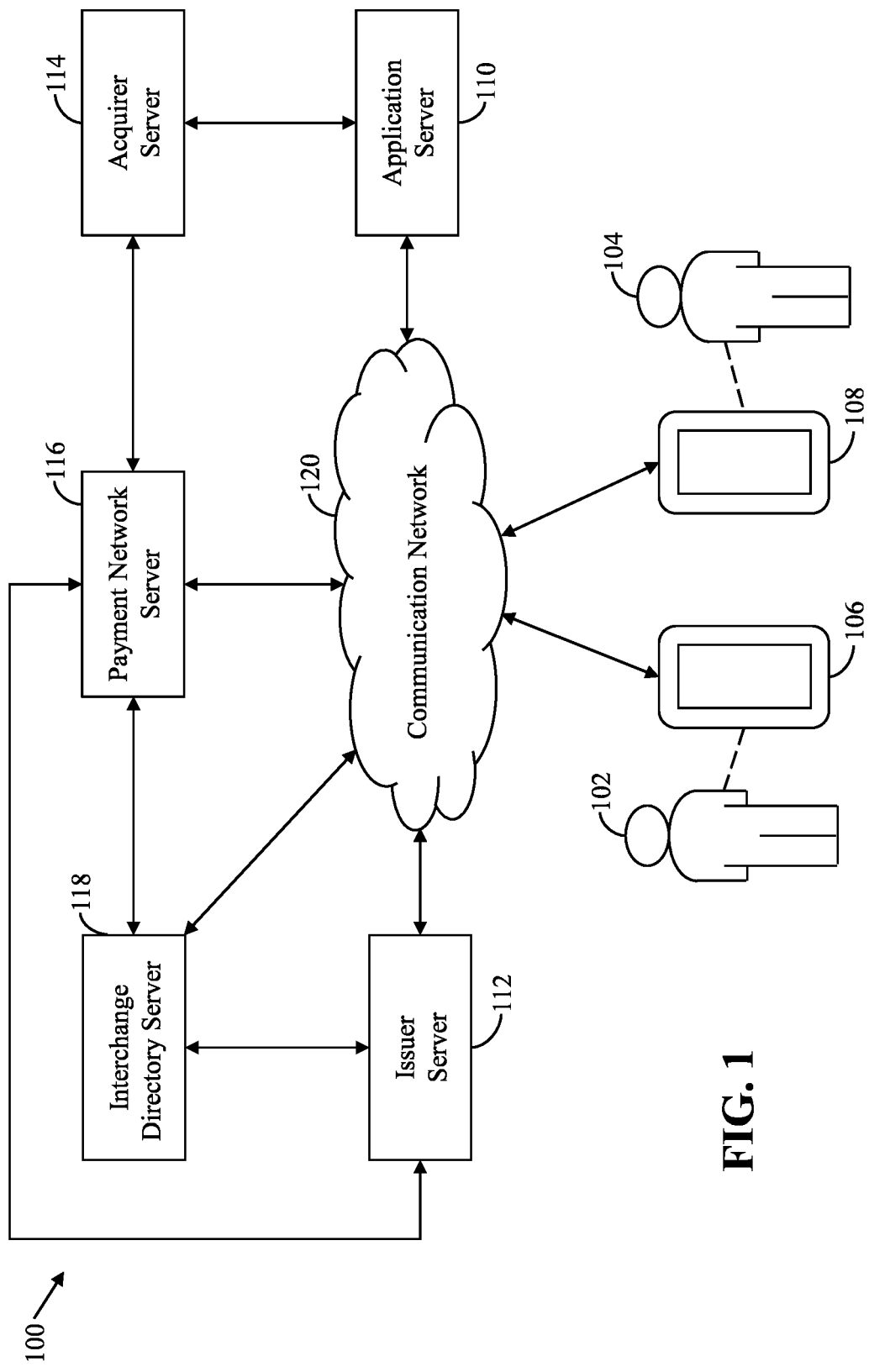
FIG. 1 is a block diagram that illustrates a system environment for facilitating payment transactions, in accordance with an exemplary embodiment of the disclosure.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION OF EMBODIMENTS

The disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

In various exemplary scenarios, a user, who is engaged in purchasing one or more products from a merchant on a regular basis, has to perform a transaction every time the one or more products are purchased from the merchant. For example, if the user purchases a product from the merchant on a daily basis, then the user has to daily perform a transaction with the merchant. Such transaction is not only time consuming but also adds to the inconvenience experienced by the user as well the merchant.

Various embodiments of the present disclosure provide a method and a system that solve the abovementioned problem by scheduling one or more payment transaction(s) for one or more future time interval(s). The method includes one or more operations that are executed by one or more servers of the disclosed system to perform scheduling and processing of the payment transactions. In an exemplary embodiment, the system includes an application server that hosts a service application, executable on one or more user devices, for enabling one or more users to schedule one or more payment transactions with other users. The one or more users, who want to avail such services by using the service application, are required to register with the application server.

After registration, the one or more users may access the service application on their respective user devices for scheduling the one or more payment transactions and initiating the one or more scheduled payment transaction(s). In one exemplary scenario, a transaction scheduling request may be initiated by a first user (i.e., a consumer) who is registered with the application server. The transaction scheduling request may be initiated, at a first time instance by the first user by using a first service application running on a first user device, for scheduling a payment transaction with a second user (i.e., a merchant) who is also registered with the application server. For example, the transaction scheduling request may be initiated at the first time instance for scheduling the payment transaction from a first payment account associated with the first user to a second payment account associated with the second user. The payment transaction may be scheduled for one or more time intervals. For example, the payment transaction may be scheduled for a second time instance that occurs at a later time than the first time instance.

The application server receives the transaction scheduling request from the first service application and communicates the transaction scheduling request to an issuer associated with the first payment account of the first user. Based on the transaction scheduling request received from the application server, the issuer may authenticate the first user by performing a first authentication method. In the first authentication method, the issuer may generate and communicate a first one-time password to the first user device of the first user. The issuer may authenticate the first user for scheduling the payment transaction upon successfully receiving the first one-time password from the first user device. Based on the successful authentication of the first user, the issuer may schedule the payment transaction between the first and second users. The issuer may communicate a transaction scheduling response to the application server indicating an outcome of the transaction scheduling request. The issuer may further generate and communicate a second one-time password to the first user device for authenticating the scheduled payment transaction upon successfully scheduling the payment transaction from the first payment account to the second payment account.

Based on the second one-time password, the scheduled payment transaction may be initiated at the second time instance in a first time interval of the one or more time intervals. A second service application running on a second user device may be utilized by the second user to initiate a payment transaction request (corresponding to the scheduled payment transaction) by using the second one-time password. The payment transaction request may include at least the second one-time password. The second service application may communicate the payment transaction request to the application server. The application server receives the payment transaction request, generates a verification request including at least the second one-time password, and communicates the verification request to the issuer for verifying the second one-time password. The application server may further process the payment transaction request based on successful verification of the second one-time password by the issuer. For example, a first transaction amount of a scheduled transaction amount may be debited by the issuer from the first payment account of the first user and credited to the second payment account of the second user based on successful processing of the payment transaction request corresponding to the scheduled payment transaction between the first and second users. The first transaction amount may be less than or equal to the scheduled transaction amount. Thus, the method and system disclosed in the present disclosure may enable users to schedule transactions for future time intervals for seamlessly performing the payment transactions.

Terms Description (in Addition to Plain and Dictionary Meaning)

Server is a physical or cloud data processing system on which a server program runs. A server may be implemented in hardware or software, or a combination thereof. In one embodiment, the server is implemented as a computer program that is executed on programmable computers, such as personal computers, laptops, or a network of computer systems. The server may correspond to one of an application server, an acquirer server, a payment network server, an issuer server, an interchange directory server, or a third-party server.

Merchant is an entity that offers various products and/or services in exchange of payments. The merchant may establish a merchant account with a financial institution to accept payments from several users.

Issuer is a financial institution where accounts of several users are established and maintained. The issuer ensures payment for authorized transactions in accordance with various payment network regulations and local legislation.

Payment network is a transaction card association that acts as an intermediate entity between acquirers and issuers to authorize and fund transactions. Examples of payment networks include Mastercard®, American Express®, VISA®, Discover®, Diners Club®, and the like. The payment network settles the transactions between various acquirers and issuers, when transaction cards are used for initiating transactions.

Payment transaction is an exchange of funds between two or more entities. For example, the payment transaction may include transferring a transaction amount from an account of a user to an account of a merchant, when the user makes a purchase of one or more products or services from the merchant. In another example, the payment transaction may include transferring the transaction amount from one account to another account or from one merchant account to another merchant account.

One or more time intervals are one or more future time intervals for scheduling one or more payment transactions between a user and a merchant.

Transaction scheduling request is a request for scheduling a payment transaction between a user and a merchant. The user may initiate the transaction scheduling request for scheduling the payment transaction in one or more future time intervals.

Scheduled payment transaction is a transaction that is scheduled for a future time interval or a future time instance. The scheduled payment transaction may be performed between a user and a merchant, when the user makes a purchase of one or more products or services from the merchant. In one example, the user may schedule the payment transaction for transferring funds (equal to or less than a scheduled transaction amount) to the merchant at a future time instance associated with one or more future time intervals.

One-time password (OTP) is a password that may be used for verification or authentication of a user or a transaction. In one embodiment, the OTP may be generated by a financial institution, such as an issuer, in response to a verification request or a transaction request. Examples of the OTP may include a numerical OTP, an alphabetical OTP, an alphanumerical OTP, a quick response (QR) code, a bar code, and the like. The OTP may be session oriented and expire after the session expires. For example, an OTP may be valid for a session of 10 minutes.

FIG. 1 is a block diagram that illustrates a system environment 100 for facilitating payment transactions, in accordance with an exemplary embodiment of the disclosure. The system environment 100 includes first and second users 102 and 104 in possession of first and second user devices 106 and 108, respectively. The system environment 100 further includes an application server 110, an issuer server 112, an acquirer server 114, a payment network server 116, and an interchange directory server 118. The first user device 106, the second user device 108, the application server 110, the issuer server 112, the acquirer server 114, the payment network server 116, and the interchange directory server 118 communicate with each other by way of a communication network 120 or through separate communication networks established therebetween.

The first and second users 102 and 104 are individuals, who are account holders of first and second payment accounts, respectively. In an embodiment, the first payment account is a payment account maintained at a financial institution, such as an issuer. Similarly, the second payment account is a payment account maintained at the same financial institution or a different financial institution. In one example, the first user 102 may be a consumer and the second user 104 may a merchant. The second user 104 may be involved in selling of products and/or services to various users, such as the first user 102, in exchange of payments. The second user 104 may be associated with a merchant store at a merchant location where the second user 104 sells the products and/or services. The merchant store may be a retail shop, a restaurant, a supermarket, a government agency, or any other individual business entity, such as a street vendor. The first user 102 may be a regular client of the second user 104 and may be involved in purchasing of the products and/or services from the second user 104 on a regular basis. For example, the first user 102 daily purchases a product (e.g., milk) worth a first amount (e.g., $5) from the retail store of the second user 104. For purchasing the product, the first user 102 has to make a transaction worth the first amount every time. The transaction may be a physical transaction (i.e., cash payment) or a digital transaction (i.e., a transaction card or electronic wallet-based payment). The first user 102 may daily perform the transaction in the same time interval. For example, the first user 102 daily performs the transaction between 7 PM and 8 PM. In another example, the first user 102 may want to perform an ad-hoc transaction or purchase at the store of the second user 104 without carrying or using the first user device 106 or any other associated physical devices.

The first user device 106 is a communication device associated with the first user 102. The first user device 106 may include suitable logic, circuitry, interfaces, and/or code, executable by the circuitry, for executing a service application (shown in FIG. 2) hosted by the application server 110. The service application running on the first user device 106 may be utilized by the first user 102 to register with the application server 110. The service application may be further utilized by the first user 102 to schedule one or more payment transactions for one or more future time interval(s) with one or more other users such as the second user 104. For example, the first user 102 may utilize the service application running on the first user device 106 for initiating a scheduling request for a daily transaction or an ad-hoc transaction with the second user 104 to purchase the product worth the first amount on a daily basis between a time interval of 7 PM and 8 PM. Based on the scheduling request initiated by the first user 102 at a first time instance, the first user device 106 (or the service application running on the first user device 106) may be configured to generate and communicate a transaction scheduling request to the application server 110. The transaction scheduling request may be communicated to the application server 110 for scheduling the daily transaction with the second user 104. The transaction scheduling request may include at least one of a first identifier of the first user 102, a second identifier of the second user 104, a scheduled transaction amount of a scheduled payment transaction, or one or more future time intervals or time instances for the scheduled payment transaction. In an embodiment, the first user device 106 may be further configured to receive one or more one-time passwords from the issuer server 112. In one example, the first user device 106 may receive a first one-time password from the issuer server 112. The first one-time password may be used for authenticating the first user 102 prior to scheduling the transaction request initiated by the first user 102. In another example, the first user device 106 may receive a second one-time password from the issuer server 112. The second one-time password may be received upon successful scheduling of the transaction request initiated by the first user 102. The second one-time password may be received before or during the one or more future time intervals for initiating and performing the scheduled payment transaction. In an embodiment, the first user device 106 may be further configured to receive one or more notifications from one or more servers, such as the application server 110 or the issuer server 112, corresponding to at least one of the transaction scheduling request or initiation of the scheduled payment transaction.

The second user device 108 is a communication device associated with the second user 104. The second user device 108 may include suitable logic, circuitry, interfaces, and/or code, executable by the circuitry, for executing the service application hosted by the application server 110. The second user device 108 may be functionally similar to the first user device 106. The second user 104 may utilize the service application running on the second user device 108 for initiating the scheduled payment transaction on behalf of the first user 102. For example, the service application may be utilized by the second user 104 to initiate the scheduled payment transaction based on the second one-time password communicated by the first user 102 to the second user 104. In another example, the service application may be utilized by the first user 102 to initiate the scheduled payment transaction based on the second one-time password. Based on the second one-time password inputted at the second user device 108, the second user device 108 (or the service application running on the second user device 108) may be configured to generate and communicate a payment transaction request corresponding to the scheduled payment transaction to the application server 110. In an embodiment, the second user device 108 may be further configured to receive one or more notifications from one or more servers, such as the application server 110 or the issuer server 112, corresponding to the scheduled payment transaction or the payment transaction request.

Examples of the first user device 106 or the second user device 108 may include a mobile phone, a smartphone, a laptop, a tablet, a phablet, a desktop computer, or any other communication device that are known in the art and are capable of communicating via the communication network 120.

The application server 110 may include suitable logic, circuitry, interfaces, and/or code, executable by the circuitry, that may be configured to perform one or more operations associated with scheduling of a payment transaction and processing of the scheduled payment transaction. The application server 110 may be a computing device, which may include a software framework, that may be configured to create the application server implementation and perform the various operations. The application server 110 may be realized through various web-based technologies, such as, but not limited to, a Java web-framework, a .NET framework, a PHP framework, a python framework, or any other web-application framework.

In an embodiment, the application server 110 may be configured to host the service application for facilitating services such as scheduling and initiating transactions between various users (for example, the first and second users 102 and 104). The application server 110 may offer such services to users, who are registered with the application server 110, by way of the service application. For registration, the first and second users 102 and 104 may provide registration details to the application server 110 by using the service application on their respective first and second user devices 106 and 108. The registration details of the first user 102 may include personal details (e.g., name, address, contact information, or the like), a first identifier (e.g., a unique user identifier), and account details of the first payment account associated with the first user 102. Likewise, the registration details of the second user 104 may include personal details (e.g., name, address, contact information, or the like), a second identifier (e.g., a unique user identifier), and account details of the second payment account associated with the second user 104. The first and second identifiers of the first and second users 102 and 104, respectively, are identification identifiers of the first and second users 102 and 104. Examples of the first and second identifiers may include, but are not limited to, alphanumeric combination, name, or any combination of special characters that may be used to uniquely identify the first and second users 102 and 104. In an embodiment, the application server 110 may be further configured to validate the registration details, for example, by communicating with issuers associated with the first and second payment accounts of the first and second users 102 and 104, respectively, or by other means that are known in the art. Based on successful validation of the registration details of the first and second users 102 and 104, the application server 110 may store the registration details of the first and second users 102 and 104 in a memory (shown in FIG. 6) of the application server 110, or a database server (not shown) communicatively coupled with the application server 110. Further, after successful registration of the first and second users 102 and 104, the application server 110 may allow the first and second users 102 and 104 to access the service application on their respective first and second user devices 106 and 108 for scheduling payment transactions and initiating the scheduled payment transactions using their registered accounts.

In an embodiment, the application server 110 may be configured to receive transaction scheduling requests from various users. For example, the application server 110 may receive the transaction scheduling request (initiated by the first user 102) at the first time instance from the first user device 106 or the service application running on the first user device 106. The transaction scheduling request may be initiated by the first user 102 for scheduling a transaction (i.e., a one-time transaction or a recurring transaction) with the second user 104. The transaction may be scheduled for the one or more future time intervals of one or more days, weeks, months, or years. For example, the transaction scheduling request may be initiated for scheduling a payment transaction from the first payment account associated with the first user 102 to the second payment account associated with the second user 104. The payment transaction may be scheduled for a second time instance of the one or more future time intervals. The second time instance occurs at a later time than the first time instance. The application server 110 may be further configured to communicate the transaction scheduling request to the issuer server 112 associated with the first payment account of the first user 102. The transaction scheduling request may be communicated to the issuer server 112 to check whether the first user 102 is eligible for scheduling a payment transaction with the second user 104. The process of scheduling the payment transaction based on the transaction scheduling request has been described later in detail in conjunction with FIGS. 2A and 2B. When the payment transaction is successfully scheduled, the application server 110 may be further configured to communicate first and second notifications to the first and second user devices 106 and 108, respectively. The first notification may be communicated to notify the first user 102 that the transaction scheduling request has been successfully processed and a payment transaction has been scheduled between the first user 102 and the second user 104. The second notification may be communicated to notify the second user 104 of the scheduled payment transaction by the first user 102. The second notification may further include scheduled payment transaction details such as the scheduled transaction amount of the scheduled payment transaction, the one or more future time intervals associated with the scheduled payment transaction, or the like. After the payment transaction is successfully scheduled, the application server 110 may be further configured to receive the payment transaction request for the scheduled payment transaction from the second user device 108. The application server 110 may be further configured to process the payment transaction request corresponding to the scheduled payment transaction between the first user 102 and the second user 104, and identify the first payment account associated with the scheduled payment transaction. Thereafter, the application server 110 may communicate the payment transaction request to a respective issuer (for example, the issuer server 112) associated with the first payment account for processing the scheduled payment transaction. The process of initiating the payment transaction through the application server 110 and processing the payment transaction by the issuer have been described later in detail in conjunction with FIGS. 3A and 3B. Upon processing of the scheduled payment transaction, the application server 110 may be further configured to communicate third and fourth notifications to the first and second user devices 106 and 108, respectively, indicating whether the scheduled payment transaction has been approved or declined by the issuer.

The issuer server 112 is a computing server that is operated by the issuer. The issuer server 112 may include suitable logic, circuitry, interfaces, and/or code, executable by the circuitry, for processing transactions. The issuer is a financial institution that manages payment accounts of multiple users, such as the first and second users 102 and 104. Account details of the payment accounts, such as the first and second payment accounts of the first and second users 102 and 104, respectively, established with the issuer are stored as account profiles in a memory (shown in FIG. 7) of the issuer server 112 or a database server (not shown) communicatively coupled with the issuer server 112. The account details of each payment account may include an account balance, an available credit line, details of an account holder, transaction history of the account holder, and other account information such as a unique account number, transaction cards linked with the unique account number, or the like. The details of the account holder may include name, age, gender, physical attributes, registered contact number, alternate contact number, registered e-mail ID, or the like of the account holder.

In an embodiment, the issuer server 112 may be configured to receive various authentication requests from the application server 110 for authenticating various users, who have initiated the transaction scheduling requests with the application server 110. For example, the issuer server 112 may receive an authentication request, corresponding to the transaction scheduling request initiated by the first user 102, from the interchange directory server 118. The issuer server 112 may process the authentication request based on the first one-time password communicated to the first user 102. The issuer server 112 may be further configured to generate an authentication response including an outcome of the authentication of the first user 102, and communicate the authentication response to the interchange directory server 118. The outcome may indicate successful or unsuccessful authentication of the first user 102. Upon successful authentication of the first user 102, the issuer server 112 may be configured to receive the transaction scheduling request initiated by the first user 102 from the application server 110. The issuer server 112 may be further configured to verify the transaction scheduling request, generate a transaction scheduling response based on verification of the transaction scheduling request, and communicate the transaction scheduling response to the application server 110. The transaction scheduling response may include at least successful or unsuccessful verification of the transaction scheduling request. Upon successful verification of the transaction scheduling request, the issuer server 112 may be further configured to schedule the payment transaction between the first and second users 102 and 104. The process of scheduling the payment transaction has been described later in detail in conjunction with FIGS. 2A and 2B.

In an embodiment, the issuer server 112 may be further configured to receive the payment transaction request from the application server 110. The payment transaction request may be initiated by the second user 104, when the first user 102 communicates the second one-time password to the second user 104. Alternatively, the payment transaction request may be initiated by the first user 102 by using the second user device 108 based on the second one-time password.

In an embodiment, the issuer server 112 may be configured to generate the first and second one-time passwords. The first one-time password may be generated by the issuer server 112 after receiving the authentication request from the interchange directory server 118, and may be communicated to the first user 102 for further processing the authentication request. The second one-time password may be generated and communicated to the first user 102 by the issuer server 112 upon successfully scheduling the payment transaction from the first payment account to the second payment account. For example, the second one-time password may be generated and communicated based on the one or more future time intervals associated with the scheduled payment transaction. In an embodiment, the issuer server 112 may be further configured to block the scheduled transaction amount associated with the scheduled payment transaction, for each future time interval, from the first payment account of the first user 102, when the second one-time password is communicated to the first user 102.

In an embodiment, the issuer server 112 may be further configured to process various payment transactions as per the transaction request received from the application server 110. Methods for processing the various payment transactions will be apparent to a person of ordinary skill in the art and may include processing of the payment transactions via the traditional four-party system or the traditional three-party system. The issuer server 112 may be further configured to generate a transaction response indicating whether the payment transaction is approved or declined, and communicate the transaction response to at least one of the first user device 106, the second user device 108, or the application server 110.

The acquirer server 114 is a computing server that is operated by an acquirer. The acquirer server 114 may include suitable logic, circuitry, interfaces, and/or code, executed by the circuitry, for processing transactions. In an embodiment, the acquirer server 114 may be configured to receive various requests and messages from the application server 110 and/or the payment network server 116. For example, the acquirer server 114 may receive the transaction scheduling request (initiated by the first user 102) and the payment transaction request (initiated by the first user 102 or the second user 104) from the application server 110. The acquirer server 114 may further receive the transaction scheduling response (generated by the issuer server 112) and the transaction response (generated by the issuer server 112) from the payment network server 116. In an embodiment, the acquirer server 114 may be further configured to communicate the various requests and messages to the application server 110 and the payment network server 116. For example, the acquirer server 114 may communicate the transaction scheduling request and the payment transaction request to relevant payment networks (for example, the payment network server 116) for further processing of the transaction scheduling request and the payment transaction request. The acquirer server 114 may further communicate the transaction scheduling response and the transaction response to the application server 110.

The payment network server 116 is a computing server that is associated with a payment network of various transaction cards. The payment network server 116 may include suitable logic, circuitry, interfaces, and/or code, executed by the circuitry, for processing transactions. The payment network server 116 represents an intermediate entity between the issuer server 112 and the acquirer server 114 for authorizing and funding the payment transactions (such as the scheduled payment transactions) performed by using the transaction cards, or any other payment mode. In an embodiment, the payment network server 116 may be configured to receive various requests and messages from the acquirer server 114 and the issuer server 112. For example, the payment network server 116 may receive the transaction scheduling request and the payment transaction request from various acquirer servers (for example, the acquirer server 114). The payment network server 116 may further receive the transaction scheduling response and the transaction response from the issuer server 112. In an embodiment, the payment network server 116 may be further configured to communicate various requests and messages to the issuer server 112 and the acquirer server 114. For example, the payment network server 116 may communicate the transaction scheduling request and the payment transaction request to relevant issuers (for example, the issuer server 112). The payment network server 116 may further communicate the transaction scheduling response and the transaction response to the acquirer server 114.

The interchange directory server 118 is a computing server that is associated with a payment network (such as the payment network server 116) or a third-party. The interchange directory server 118 may include suitable logic, circuitry, interfaces, and/or code, executed by the circuitry, for routing various requests and messages between various entities. In an embodiment, the interchange directory server 118 may represent an intermediate entity between the application server 110 and the issuer server 112 for facilitating communication of various requests and messages between the application server 110 and the issuer server 112. The interchange directory server 118 may include a directory or log of various entities (such as issuers) for facilitating effective and efficient communication of various requests and messages between the application server 110 and the issuer server 112. For example, the interchange directory server 118 may receive the authentication request from the application server 110 and communicate the authentication request to the issuer server 112. The interchange directory server 118 may further receive the authentication response from the issuer server 112 and communicate the authentication response to the application server 110.

Examples of the application server 110, the issuer server 112, the acquirer server 114, the payment network server 116, or the interchange directory server 118 may include, but are not limited to, computers, laptops, mini-computers, mainframe computers, any non-transient and tangible machines that can execute a machine-readable code, cloud-based servers, distributed server networks, a network of computer systems, or a combination thereof.

Though the application server 110 is shown to be a standalone entity in FIG. 1, in some embodiments, the application server 110 may be integrated with any of the issuer server 112, the acquirer server 114, the payment network server 116, the interchange directory server 118, or any other third-party server, without deviating from the scope of the disclosure. For example, when the application server 110 is integrated with the issuer server 112, the functionality of the application server 110 may be implemented and executed by the issuer server 112. In another example, when the application server 110 is integrated with the acquirer server 114, the functionality of the application server 110 may be implemented and executed by the acquirer server 114. In another example, when the application server 110 is integrated with the payment network server 116, the functionality of the application server 110 may be implemented and executed by the payment network server 116. In another example, when the application server 110 is integrated with the interchange directory server 118, the functionality of the application server 110 may be implemented and executed by the interchange directory server 118. Similarly, the interchange directory server 118 may be integrated with any of the application server 110, the issuer server 112, the acquirer server 114, the payment network server 116, or any other third-party server, without deviating from the scope of the disclosure.

The communication network 120 is a medium through which content and messages are transmitted between the first user device 106, the second user device 108, the application server 110, the issuer server 112, the acquirer server 114, the payment network server 116, the interchange directory server 118, or other entities involved in various transaction scheduling and processing. Examples of the communication network 120 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the system environment 100 may connect to the communication network 120 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the first user device 106 may be utilized by the first user 102 for scheduling the payment transaction with the second user 104. The first and second users 102 and 104 may be registered with the application server 110 for availing scheduling-based transaction services. Prior to scheduling the payment transaction, the service application running on the first user device 106 may be utilized by the first user 102 to search the second user 104 on the service application. The first user 102 may search the second user 104 based on at least one of the registration details of the second user 104. The registration details of the second user 104 may include the personal details (e.g., name, address, contact information, or the like) of the second user 104, the second identifier (e.g., a unique user identifier) associated with the second user 104, and the account details of the second payment account of the second user 104. Upon searching the second user 104, the first user 102 may utilize the service application running on the first user device 106 to initiate the transaction scheduling request for scheduling the payment transaction with the second user 104 for the one or more future time intervals. For example, the transaction scheduling request may be initiated at the first time instance for scheduling the payment transaction from the first payment account associated with the first user 102 to the second payment account associated with the second user 104. The payment transaction may be scheduled for the second time instance associated with the one or more future time intervals. The second time instance occurs at a later time than the first time instance. The transaction scheduling request may include the first identifier of the first user 102, the second identifier of the second user 104, the scheduled transaction amount for the scheduled payment transaction, and the one or more future time intervals for the scheduled payment transaction. The first user device 106 (or the service application running on the first user device 106) may communicate the transaction scheduling request to the application server 110.

In an embodiment, the application server 110 may receive the transaction scheduling request from the first user device 106 (or the service application running on the first user device 106). Based on the transaction scheduling request, the application server 110 may generate the authentication request for authenticating the first user 102. The authentication request may include at least one of the registration details of the first user 102. The registration details of the first user 102 may include the personal details (e.g., name, address, contact information, or the like) of the first user 102, the first identifier (e.g., a unique user identifier) associated with the first user 102, and the account details of the first payment account of the first user 102. The application server 110 may further communicate the authentication request to the interchange directory server 118. The interchange directory server 118 may further communicate the authentication request to the issuer server 112. After receiving the authentication request, the issuer server 112 may perform a first authentication method for authenticating the first user 102.

In the first authentication method, the issuer server 112 may generate the first one-time password and communicate the first one-time password to the first user device 106 based on at least one of the registration details (e.g., contact information) of the first user 102. Alternatively, the first user 102 may receive the first one-time password through the service application running on the first user device 106. In an embodiment, the issuer server 112 may generate a dynamic authentication web page (for example, a three-domain (3D) secure page) for authenticating the first user 102. The dynamic authentication webpage is an extended markup language (XML) page generated by the issuer server 112 for secure authentication of the users (such as the first user 102), as known by those skilled in the art. The issuer server 112 may render the dynamic authentication web page on the first user device 106 by way of the service application running on the first user device 106, and may prompt the first user 102 to input the first one-time password into the dynamic authentication web page. When the first user 102 inputs the first one-time password into the dynamic authentication web page, the first user device 106 (or the service application running on the first user device 106) may communicate the inputted first one-time password to the issuer server 112. The issuer server 112 may receive the first one-time password through the dynamic authentication web page. The issuer server 112 may further compare the communicated first one-time password with the received first one-time password. In a non-limiting example, it is assumed that the communicated first one-time password matches with the received first one-time password. In such a scenario, the issuer server 112 may generate the authentication response including the outcome of the authentication of the first user 102. The outcome may indicate successful authentication of the first user 102 since the communicated first one-time password matches with the received first one-time password. Alternatively, when the communicated first one-time password does not match with the received first one-time password, the outcome may indicate unsuccessful authentication of the first user 102.

In an embodiment, the issuer server 112 may further communicate the authentication response to the interchange directory server 118. The interchange directory server 118 may further communicate the authentication response to the application server 110. Based on the successful authentication of the first user 102, the application server 110 may further communicate the transaction scheduling request to the acquirer server 114. The transaction scheduling request may be updated by the application server 110 by including an authentication parameter indicating successful authentication of the first user 102. The acquirer server 114 may communicate the transaction scheduling request to the payment network server 116. The payment network server 116 may communicate the transaction scheduling request to the issuer server 112. The issuer server 112 may receive the transaction scheduling request from the payment network server 116. The issuer server 112 may further verify the authentication parameter included in the transaction scheduling request. In a non-limiting example, it is assumed that the authentication parameter is successfully verified by the issuer server 112. Based on the successful verification of the authentication parameter, the issuer server 112 may process the transaction scheduling request and schedule the payment transaction between the first and second users 102 and 104 (i.e., from the first payment account to the second payment account). The issuer server 112 may further generate the transaction scheduling response and communicate the transaction scheduling response to the payment network server 116. The payment network server 116 may communicate the transaction scheduling response to the acquirer server 114. The acquirer server 114 may communicate the transaction scheduling response to the application server 110. Based on the transaction scheduling response, the application server 110 may determine whether the payment transaction has been successfully scheduled or not. In a non-limiting example, it is assumed that the payment transaction has been successfully scheduled between the first and second users 102 and 104. Based on the transaction scheduling response, the application server 110 may generate and communicate the first notification to the first user 102. The first notification may be communicated to notify the first user 102 that the transaction scheduling request has been successfully processed and the payment transaction has been scheduled between the first user 102 and the second user 104 for the one or more future time intervals. The application server 110 may further generate and communicate the second notification to the second user 104. The second notification may be communicated to notify the second user 104 of the scheduled payment transaction by the first user 102. The second notification may further include the scheduled payment transaction details such as the scheduled transaction amount of the scheduled payment transaction, the one or more future time intervals associated with the scheduled payment transaction, or the like.

After the payment transaction is successfully scheduled, the issuer server 112 may generate a one-time password for each scheduled payment transaction associated with each of the one or more future time intervals for initiating the scheduled payment transaction. For example, the issuer server 112 may generate the second one-time password for initiating the scheduled payment transaction. The second one-time password may be generated at a third time instance that may or may not be associated with the one or more future time intervals such as a first future time interval associated with the scheduled payment transaction. The issuer server 112 may further communicate the second one-time password to the first user 102 based on at least one of the registration details (e.g., contact information) of the first user 102. Alternatively, the first user 102 may receive the second one-time password through the service application running on the first user device 106. The second one-time password may be communicated at a fourth time instance that may or may not be associated with the first future time interval. Here, the third and fourth time instances may occur at a later time than the first time instance. The issuer server 112 may further block the scheduled transaction amount associated with the scheduled payment transaction, for the first future time interval, from the first payment account of the first user 102, when the second one-time password has been communicated to the first user 102.

In an embodiment, the scheduled payment transaction may be initiated by the first user 102 at the second time instance associated with the first future time interval by using the second one-time password communicated by the issuer server 112. For initiating the scheduled payment transaction, the first user 102 may communicate the second one-time password to the second user 104. The second user 104 may utilize the second user device 108 to access the service application and select an option to initiate the payment transaction request corresponding to the scheduled payment transaction. Alternatively, the first user 102 may utilize the second user device 108 to access the service application and select an option to initiate the payment transaction request corresponding to the scheduled payment transaction. The second user 104 (or the first user 102) may input the second one-time password. The second user 104 (or the first user 102) may also input a first transaction amount corresponding to a purchase of products and/or services by the first user 102. The first transaction amount may be less than or equal to the scheduled transaction amount of the scheduled payment transaction. In certain embodiments, the first transaction amount is equal to the scheduled transaction amount, when the second user 104 (or the first user 102) does not input the first transaction amount. The second user device 108 (or the service application running on the second user device 108) may communicate the payment transaction request for the scheduled payment transaction to the application server 110. The transaction request may include at least the second one-time password and/or the first transaction amount.

Based on the payment transaction request, the application server 110 may generate a verification request for verifying the second one-time password. The application server 110 may communicate the verification request to the interchange directory server 118. The interchange directory server 118 may further communicate the verification request to the issuer server 112. The issuer server 112 may verify the second one-time password and generate a verification response based on verification of the second one-time password. The verification response may include an outcome of the verification of the second one-time password. The outcome may be indicative of successful or unsuccessful verification of the second one-time password. In a non-limiting example, it is assumed that the second one-time password is successfully verified. The issuer server 112 may then communicate the verification response to the interchange directory server 118. The interchange directory server 118 may further communicate the verification response to the application server 110. Based on the verification response (i.e., when the outcome of the verification indicates the successful verification of the second one-time password), the application server 110 may communicate the payment transaction request to the acquirer server 114 for processing the scheduled payment transaction. The acquirer server 114 may communicate the payment transaction request to the payment network server 116. The payment network server 116 may communicate the payment transaction request to the issuer server 112. The issuer server 112 may further process the payment transaction request corresponding to the scheduled payment transaction between the first user 102 and the second user 104. Methods for processing the various payment transactions will be apparent to a person of ordinary skill in the art and may include processing of the payment transactions via the traditional four-party system or the traditional three-party system. Based on successful processing of the scheduled payment transaction, the first transaction amount of the scheduled transaction amount may be debited by the issuer server 112 from the first payment account of the first user 102 and credited to the second payment account of the second user 104. The first transaction amount may be less than or equal to the scheduled transaction amount.

In an embodiment, the issuer server 112 may generate the transaction response based on the processing of the payment transaction request corresponding to the scheduled payment transaction between the first user 102 and the second user 104. The issuer server 112 may communicate the transaction response to the payment network server 116. The payment network server 116 may communicate the transaction response to the acquirer server 114. The acquirer server 114 may communicate the transaction response to the application server 110. Based on the transaction response, the application server 110 may generate and communicate the third and fourth notifications to the first and second user devices 106 and 108, respectively. The third and fourth notifications may indicate whether the scheduled payment transaction has been approved or declined based on processing of the transaction request by the issuer server 112.

Figure 2A:
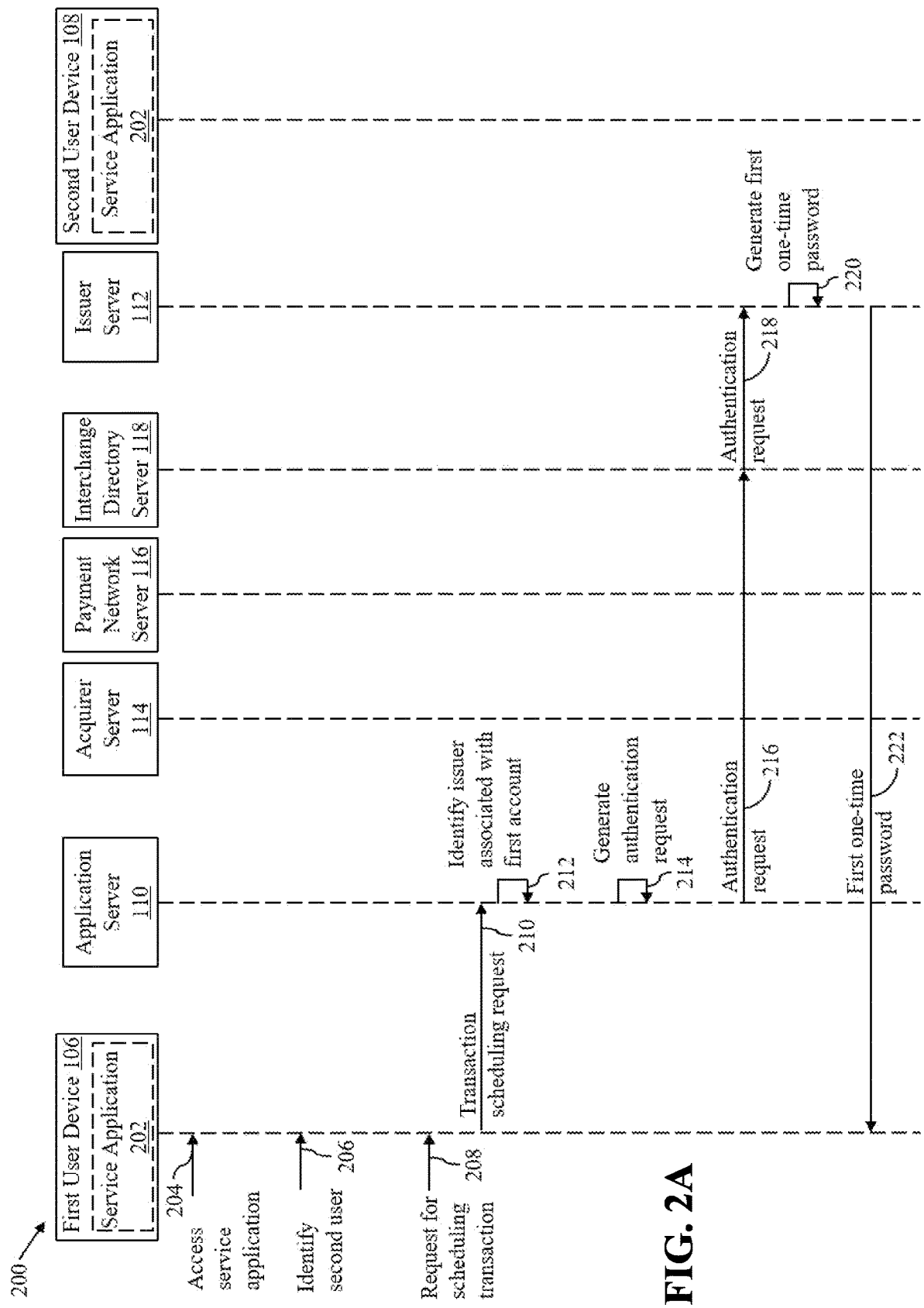
FIGS. 2A and 2B, collectively, represent a process flow diagram that illustrates an exemplary scenario for scheduling payment transactions between various users of FIG. 1, in accordance with an exemplary embodiment of the disclosure.
Figure 2B:
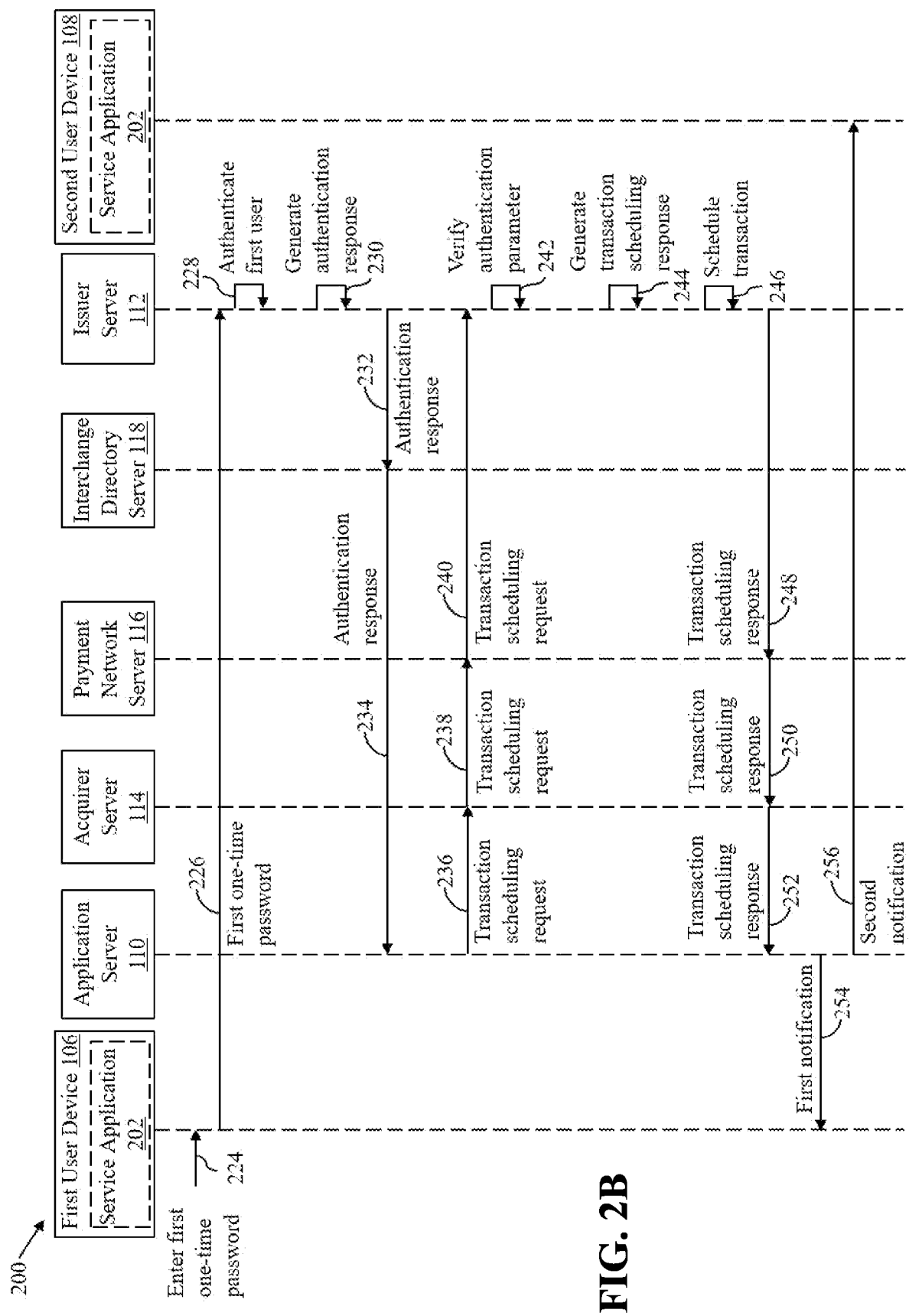

FIGS. 2A and 2B, collectively, represent a process flow diagram 200 that illustrates an exemplary scenario for scheduling payment transactions between various users (such as the first and second users 102 and 104), in accordance with an exemplary embodiment of the disclosure.

The process flow diagram 200 involves the first user device 106, the second user device 108, the application server 110, the issuer server 112, the acquirer server 114, the payment network server 116, and the interchange directory server 118. The first and second user devices 106 and 108 execute the service application hosted by the application server 110. Hereinafter, the service application is designated and referred to as "the service application 202". The service application 202 serves as a gateway to the application server 110. For the sake of brevity, it is assumed that the first and second users 102 and 104 are already registered with the application server 110 (as described in FIG. 1).

For scheduling the payment transaction from the first payment account associated with the first user 102 to the second payment account associated with the second user 104, the first user 102 accesses (i.e., opens) the service application 202 running on the first user device 106 (as shown by arrow 204). The first user 102 utilizes the service application 202 and identifies the second user 104 based on at least the second identifier of the second user 104 (as shown by arrow 206). For example, the first user 102 may utilize the service application 202 and search the second identifier of the second user 104 in the service application 202 to identify the second user 104. In some embodiments, the second user 104 may be identified based on a GPS location of the first user 102. In some embodiments, the second user 104 may be identified from a list all users or merchants registered/onboarded on the service application 202. After identifying the second user 104, the first user 102 utilizes the service application 202 to initiate the transaction scheduling request for scheduling the payment transaction with the second user 104 (as shown by arrow 208). The first user 102 may provide details such as, the first identifier, the second identifier, the scheduled transaction amount, and the one or more future time intervals, that may be required for scheduling the payment transaction with the second user 104.

The first user device 106 (or the service application 202 running on the first user device 106) communicates, at the first time instance, the transaction scheduling request including the details provided by the first user 102 to the application server 110 (as shown by arrow 210). Based on at least the first identifier of the first user 102, the application server 110 identifies the first payment account of the first user 102 and the account details of the first payment account. The application server 110 further identifies the issuer (e.g., the issuer server 112) associated with the first payment account of the first user 102 (as shown by arrow 212). After identifying the issuer associated with the first payment account, the application server 110 generates the authentication request for authenticating the first user 102 (as shown by arrow 214). The authentication request may include at least one of the first identifier of the first user 102 or the account details of the first payment account of the first user 102. The application server 110 communicates the authentication request to the interchange directory server 118 (as shown by arrow 216). The interchange directory server 118 communicates the authentication request to the issuer server 112 (as shown by arrow 218).

The issuer server 112 receives the authentication request from the interchange directory server 118. Based on the authentication request, the issuer server 112 generates the first one-time password for authenticating the first user 102 (as shown by arrow 220). The issuer server 112 communicates the first one-time password to the first user device 106 (as shown by arrow 222). For example, the issuer server 112 may communicate the first one-time password to the first user 102 by utilizing a registered contact number of the first user 102 or a registered e-mail ID of the first user 102. The issuer server 112 further generates the dynamic authentication web page for authenticating the first user 102. The dynamic authentication web page is rendered on a user interface of the first user device 106 by way of the service application 202.

With reference to FIG. 2B, the first user 102 receives the first one-time password from the issuer server 112 and provides the received first one-time password on the dynamic authentication web page (as shown by arrow 224). The first user device 106 (or the service application 202 running on the first user device 106) communicates the first one-time password to the issuer server 112 through the dynamic authentication web page (as shown by arrow 226). The issuer server 112 authenticates the first user 102 based on a successful matching by comparing the communicated first one-time password and the received first one-time password (as shown by arrow 228). Based on the comparison, the issuer server 112 generates the authentication response indicating the authentication of the first user 102 (as shown by arrow 230). In one example, the communicated first one-time password may not match with the received first one-time password. In such a scenario, the authentication response may indicate unsuccessful authentication of the first user 102. In another example, the communicated first one-time password may match with the received first one-time password. In such a scenario, the authentication response may indicate successful authentication of the first user 102. In a non-limiting example, it is assumed that the authentication response indicates that the first user 102 has been successfully authenticated. The issuer server 112 communicates the authentication response to the interchange directory server 118 (as shown by arrow 232). The interchange directory server 118 communicates the authentication response to the application server 110 (as shown by arrow 234).

The application server 110 receives the authentication response from the interchange directory server 118. Based on the authentication response, the application server 110 determines whether the first user 102 has been successfully authenticated or not. Based on the successful authentication of the first user 102, the application server 110 communicates the transaction scheduling request to the acquirer server 114 (as shown by arrow 236). The transaction scheduling request may include the authentication parameter. The acquirer server 114 receives the transaction scheduling request from the application server 110 and identifies a payment network (such as the payment network server 116) associated with the first payment account of the first user 102 who has initiated the transaction scheduling request. The acquirer server 114 communicates the transaction scheduling request to the payment network server 116 (as shown by arrow 238). The payment network server 116 receives the transaction scheduling request and identifies the issuer (such as the issuer server 112) associated with the first payment account of the first user 102 who has initiated the transaction scheduling request. The payment network server 116 communicates the transaction scheduling request to the issuer server 112 (as shown by arrow 240).

The issuer server 112 verifies the authentication parameter included in the transaction scheduling request (as shown by arrow 242). Based on the verification of the authentication parameter, the issuer server 112 generates the transaction scheduling response corresponding to the transaction scheduling request (as shown by arrow 244). In one example, the authentication parameter may not be successfully verified. In such a scenario, the transaction scheduling response indicates a failure of the transaction scheduling request. In another example, the authentication parameter may be successfully verified. In such a scenario, the issuer server 112 schedules the payment transaction based on the transaction scheduling request (as shown by arrow 246). When the authentication parameter is successfully verified, the transaction scheduling response indicates a success of the transaction scheduling request. The issuer server 112 further communicates the transaction scheduling response to the payment network server 116 (as shown by arrow 248).

The payment network server 116 receives the transaction scheduling response and communicates the received transaction scheduling response to the acquirer server 114 (as shown by arrow 250). The acquirer server 114 receives the transaction scheduling response and communicates the transaction scheduling response to the application server 110 (as shown by arrow 252). By way of the transaction scheduling response, the application server 110 determines about the success or failure of the transaction scheduling request. In a non-limiting example, it is assumed that the payment transaction has been successfully scheduled by the issuer server 112. The application server 110 communicates the first notification to the first user device 106 (as shown by arrow 254). The first notification notifies the first user 102 that the payment transaction has been successfully scheduled with the second user 104. The application server 110 further communicates the second notification to the second user device 108 (as shown by arrow 256). The second notification notifies the second user 104 that the first user 102 has successfully scheduled the payment transaction with the second user 104.

In one embodiment, the first user 102 may schedule a real-time payment transaction. For example, the first user 102 wants to purchase the products and/or services in real-time from the second user 104 and wants to perform the payment transaction using the service application 202. In such a scenario, the first user 102 may schedule a real-time payment transaction for a current time interval (or a current time instance) for a current transaction amount by using the service application 202. In another embodiment, the first user 102 may schedule a weekly or monthly payment transaction. For example, the first user 102 wants to perform a payment transaction on every Sunday morning in a time interval of one hour (i.e., 10 AM-11 AM). In such a scenario, the first user 102 may initiate a transaction scheduling request for scheduling a payment transaction with the second user 104 for every Sunday in the time interval of 10 AM-11 AM. In another example, the first user 102 may schedule a payment transaction once every month.

Figure 3A:
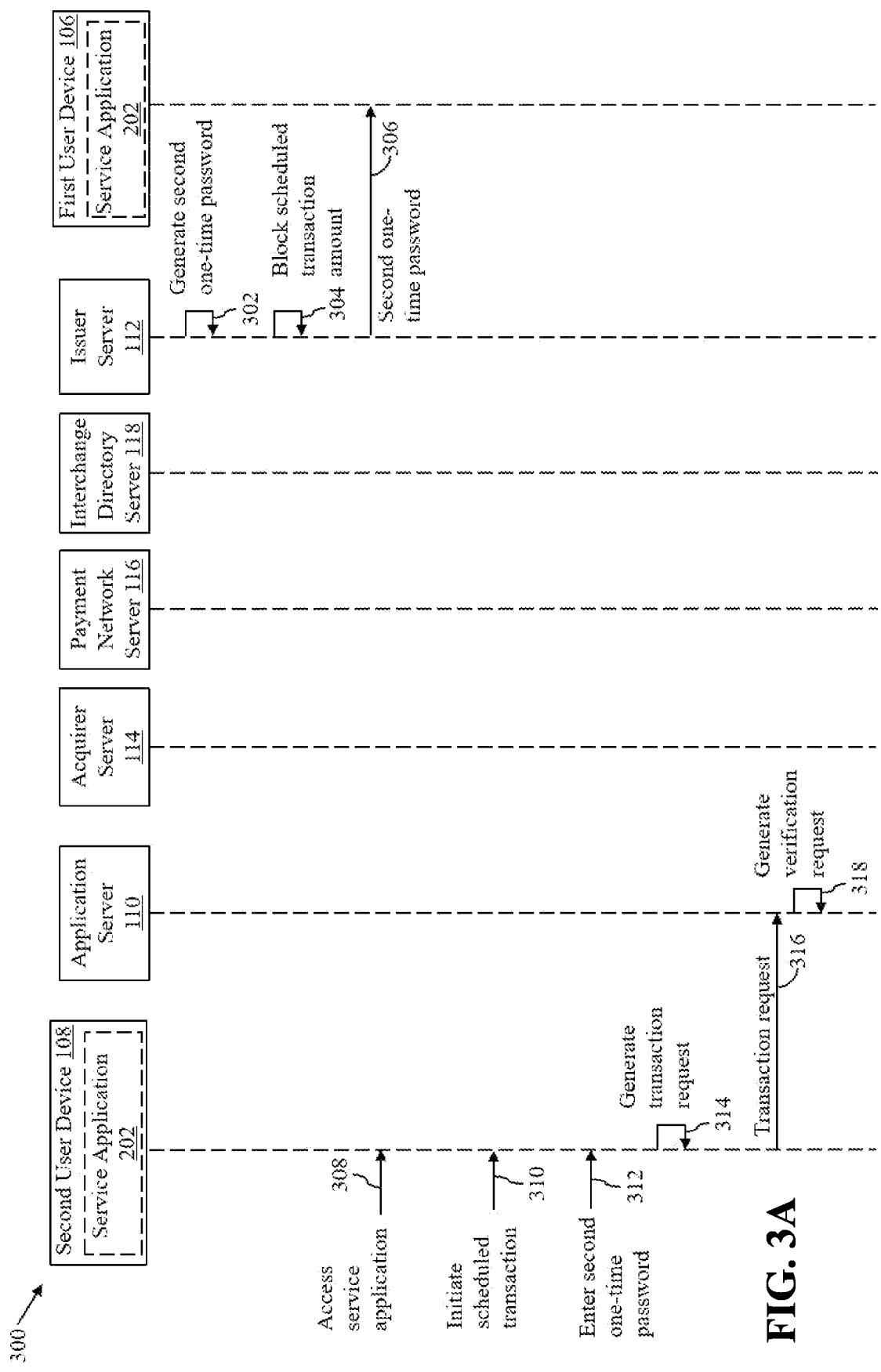
FIGS. 3A and 3B, collectively, represent a process flow diagram that illustrates an exemplary scenario for processing scheduled payment transactions, in accordance with an exemplary embodiment of the disclosure.
Figure 3B:
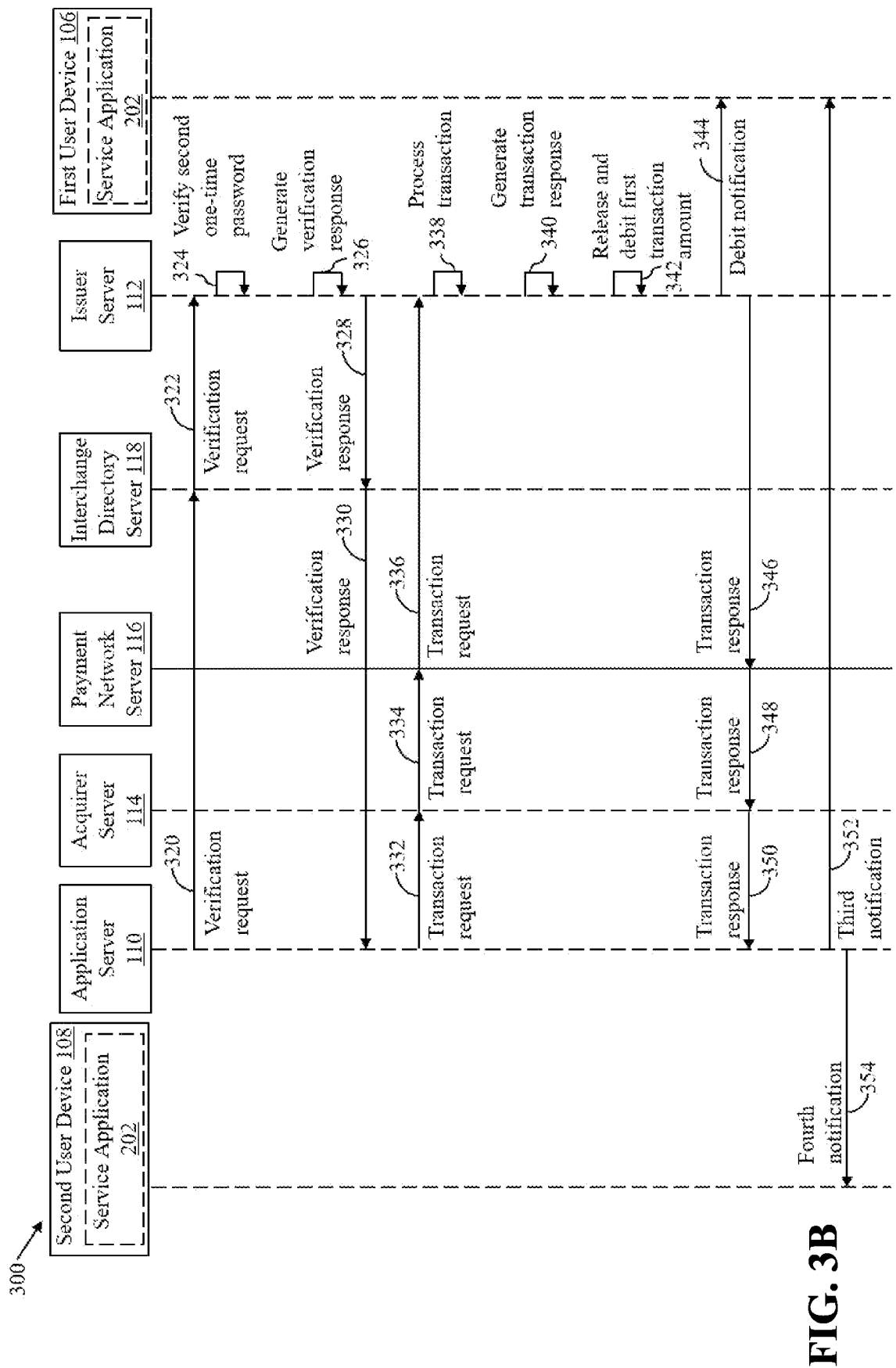

FIGS. 3A and 3B, collectively, represent a process flow diagram 300 that illustrates an exemplary scenario for processing scheduled payment transactions, in accordance with an exemplary embodiment of the disclosure. The process flow diagram 300 involves the first user device 106, the second user device 108, the application server 110, the issuer server 112, the acquirer server 114, the payment network server 116, and the interchange directory server 118. With reference to FIGS. 2A and 2B, the first user 102 may have scheduled the payment transaction with the second user 104 for the one or more future time intervals (such as the first future time interval) or one or more future time instances (such as the second time instance) associated with the one or more future time intervals.

The issuer server 112 generates the second one-time password for performing the scheduled payment transaction (as shown by arrow 302). The second one-time password may be generated at the third time instance. After generating the second one-time password, the issuer server 112 blocks the scheduled transaction amount of the scheduled payment transaction from the first payment account of the first user 102 (as shown by arrow 304). The issuer server 112 communicates the second one-time password to the first user device 106 (as shown by arrow 306). The second one-time password may be communicated at the fourth time instance. For example, the first future time interval corresponds to a time interval of 7 PM-8 PM. In one scenario, the third time instance may correspond to 7 PM and the fourth time instance may correspond to 7:02 PM. In another example, where the issuer server 112 experiences a poor connectivity, the third time instance may correspond to 7:05 PM and the fourth time instance may correspond to 7:06 PM. In another example, the third time instance may correspond to 6:55 PM and the fourth time instance may correspond to 7:01. It will be apparent to a person of ordinary skill in the art that the various time instances described in the disclosure are illustrated for exemplary purposes and do not limit the scope of the disclosure. The first user device 106 may receive the second one-time password from the issuer server 112. The first user device 106 may communicate the second one-time password to the first user 102.

The first user 102 may visit a retail store of the second user 104 to purchase the products and/or services from the second user 104. The first user 102 may visit the retail store at any time instant associated with the first future time interval, or even before the start of the first future time interval. After selecting the products and/or services from the retail store of the second user 104, the first user 102 may initiate the scheduled payment transaction at the second time instance associated with the first future time interval (i.e., after receiving the second one-time password from the issuer server 112). Here, the second time instance occurs at a later time than the third time instance and the fourth time instance. In an embodiment, the second user 104 may even configure the list of upcoming scheduled payment transactions by defining a time interval in the service application 202. Hence, the list of upcoming scheduled payment transactions in that time interval may only be displayed in the service application 202. For example, the second user 104 may configure a time period as 60 minutes in the service application 202. Hence, the list of upcoming scheduled payment transactions in the next 60 minutes may only be fetched and displayed on the second user device 108. Thereafter, the list of upcoming scheduled payment transactions may get refreshed. Further, to initiate the scheduled payment transaction, the scheduled payment transaction is first identified from the list of scheduled payment transactions in the service application 202. In one example, the second user 104 may identify the scheduled payment transaction based on the second notification received from the application server 110. In another example, the second user 104 may utilize the first identifier associated with the first user 102 to identify the scheduled payment transaction. In another example, the second user 104 may identify the scheduled payment transaction by accessing a log of scheduled payment transactions facilitated by the application server 110. After identifying the scheduled payment transaction associated with the first user 102, the second one-time password is then required to enter for initiating the scheduled payment transaction by accessing the service application 202 on the second user device 108 (as shown by arrow 308). In one example, the first user 102 may access the service application 202 on the second user device 108 to enter the second one-time password. In another example, the second user 104 may access the service application 202 on the second user device 108 to enter the second one-time password. After accessing the service application 202 running on the second user device 108, the scheduled payment transaction may be initiated through the service application 202 running on the second user device 108 (as shown by arrow 310). The first user 102 or the second user 104 (or any other user at the store) may initiate the scheduled payment transaction by entering at least one of the second one-time password or the first transaction amount in the service application 202 (as shown by arrow 312). Based on at least one of the second one-time password or the first transaction amount, the service application 202 generates the payment transaction request for processing the scheduled payment transaction (as shown by arrow 314). The second user device 108 (or the service application 202 running on the second user device 108) communicates the payment transaction request to the application server 110 (as shown by arrow 316). The application server 110 generates the verification request for verifying the second one-time password based on the payment transaction request (as shown by arrow 318). The verification request includes at least the second one-time password associated with the scheduled payment transaction.

With reference to FIG. 3B, the application server 110 communicates the verification request to the interchange directory server 118 (as shown by arrow 320). The interchange directory server 118 communicates the verification request to the issuer server 112 (as shown by arrow 322). Based on the verification request received from the interchange directory server 118, the issuer server 112 verifies the second one-time password (as shown by arrow 324). For verification of the second one-time password, the issuer server 112 compares the communicated second one-time password and the received second one-time password. Based on the comparison, the issuer server 112 generates the verification response indicating the outcome of the verification of the second one-time password (as shown by arrow 326). In one example, the communicated second one-time password may not match with the received second one-time password. In such a scenario, the verification response may indicate unsuccessful verification of the second one-time password. In another example, the communicated second one-time password may match with the received second one-time password. In such a scenario, the verification response may indicate successful verification of the second one-time password. In a non-limiting example, it is assumed that the verification response indicates that the second one-time password has been successfully verified. The issuer server 112 communicates the verification response to the interchange directory server 118 (as shown by arrow 328). The interchange directory server 118 communicates the verification response to the application server 110 (as shown by arrow 330).

The application server 110 receives the verification response from the interchange directory server 118. Based on the successful verification of the second one-time password, the application server 110 communicates the payment transaction request to the acquirer server 114 (as shown by arrow 332). The acquirer server 114 receives the payment transaction request from the application server 110 and identifies a payment network (such as the payment network server 116) associated with the scheduled payment transaction. The acquirer server 114 communicates the payment transaction request to the payment network server 116 (as shown by arrow 334). The payment network server 116 receives the payment transaction request and identifies an issuer (such as the issuer server 112) associated with the scheduled payment transaction. The payment network server 116 communicates the payment transaction request to the issuer server 112 (as shown by arrow 336).

The issuer server 112 receives the payment transaction request from the payment network server 116 and processes the scheduled payment transaction based on the payment transaction request (as shown by arrow 338). Based on processing of the payment transaction request, the issuer server 112 generates the transaction response (as shown by arrow 340). For processing the scheduled payment transaction associated with the received payment transaction request, the issuer server 112 may perform a check to determine whether the scheduled payment transaction is initiated within the first future time interval or at the second time instance associated with the first future time interval. In one scenario, the scheduled payment transaction may have been initiated after the first future time interval. In such a case, the issuer server 112 may decline the scheduled payment transaction and the transaction response may indicate that the scheduled payment transaction has been declined. In another scenario, the scheduled payment transaction may have been initiated within the first future time interval. In such a case, the issuer server 112 may further perform a check to determine whether the first transaction amount is less than or equal to the scheduled transaction amount. In one scenario, the first transaction amount may be greater than the scheduled transaction amount. In such a scenario, the issuer server 112 may decline the scheduled payment transaction and the transaction response may indicate that the scheduled payment transaction has been declined. In another scenario, the first transaction amount may be less than or equal to the scheduled transaction amount. In such a case, the issuer server 112 releases the blocked scheduled transaction amount, and debits the first transaction amount from the first payment account (as shown by arrow 342). When the first transaction amount is equal to the scheduled transaction amount, the issuer server 112 debits the scheduled transaction amount. When the first transaction amount is less than the scheduled transaction amount, the issuer server 112 debits the first transaction amount and credits the remaining amount (i.e., difference between the scheduled transaction amount and the first transaction amount) to the first payment account. The debited first transaction amount is further credited to the second payment account of the second user 104 based on successful processing of the scheduled payment transaction.

The issuer server 112 communicates a debit notification to the first user device of the first user 102 (as shown by arrow 344). The issuer server 112 may communicate the debit notification to the first user 102 by utilizing a registered contact number or a registered e-mail ID of the first user 102. The issuer server 112 further communicates the transaction response to the payment network server 116 (as shown by arrow 346). The payment network server 116 communicates the transaction response to the acquirer server 114 (as shown by arrow 348). The acquirer server 114 communicates the transaction response to the application server 110 (as shown by arrow 350). The application server 110 may process the transaction response to determine whether the scheduled payment transaction has been successfully processed or not. In a non-limiting example, it is assumed that the scheduled payment transaction has been successfully processed by the issuer server 112. The application server 110 further communicates the third notification to the first user 102 through the service application 202 running on the first user device 106 (as shown by arrow 352). The application server 110 further communicates the fourth notification to the second user 104 through the service application 202 running on the second user device 108 (as shown by arrow 354). The third and fourth notifications may indicate whether the scheduled payment transaction has been approved or declined based on processing of the scheduled payment transaction by the issuer server 112.

Figure 4A:
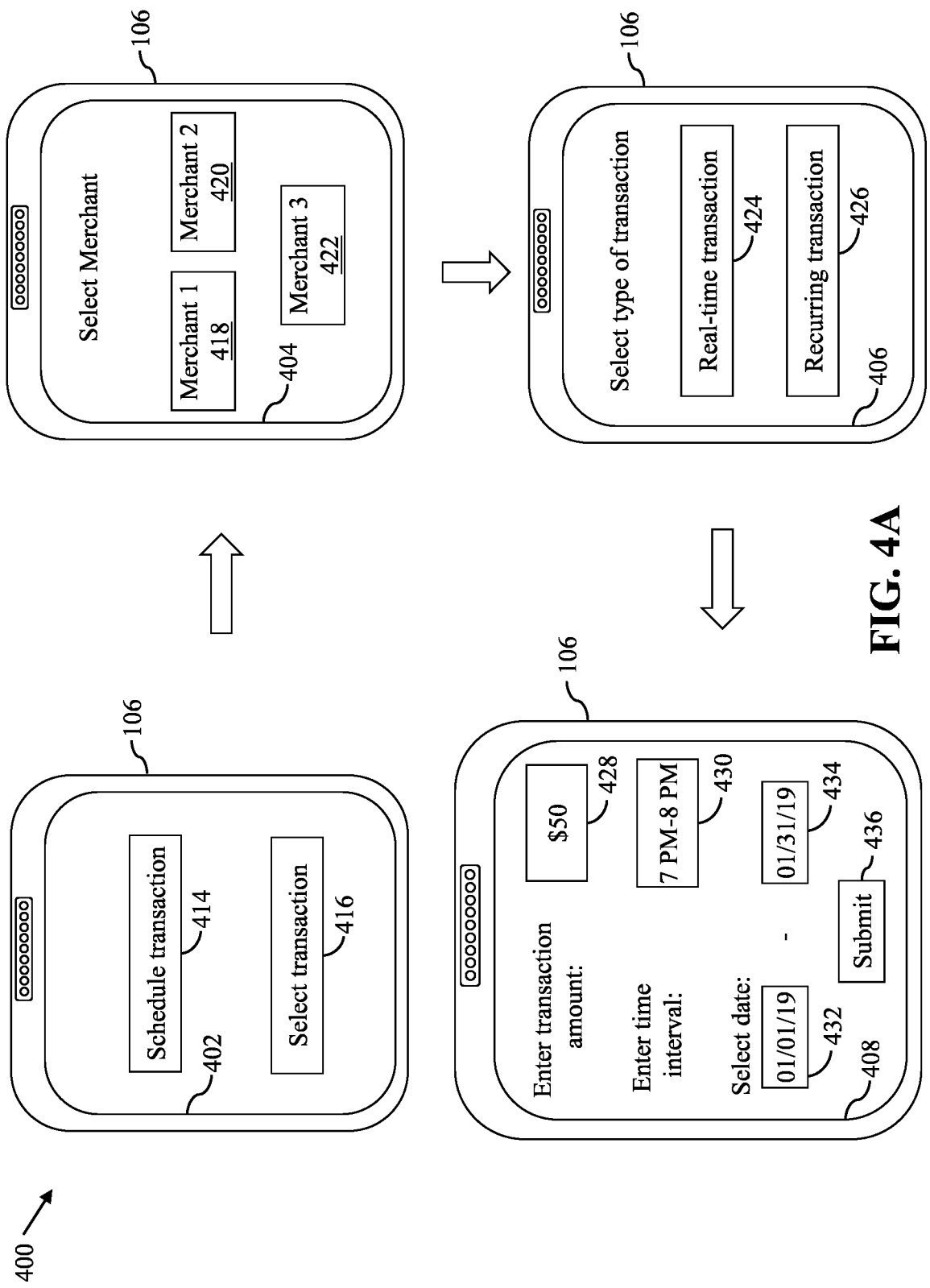
FIGS. 4A and 4B, collectively, represent an exemplary scenario that illustrates user interface (UI) screens rendered on a first user device of FIG. 1 for scheduling a payment transaction between various users of FIG. 1, in accordance with an exemplary embodiment of the disclosure.
Figure 4B:
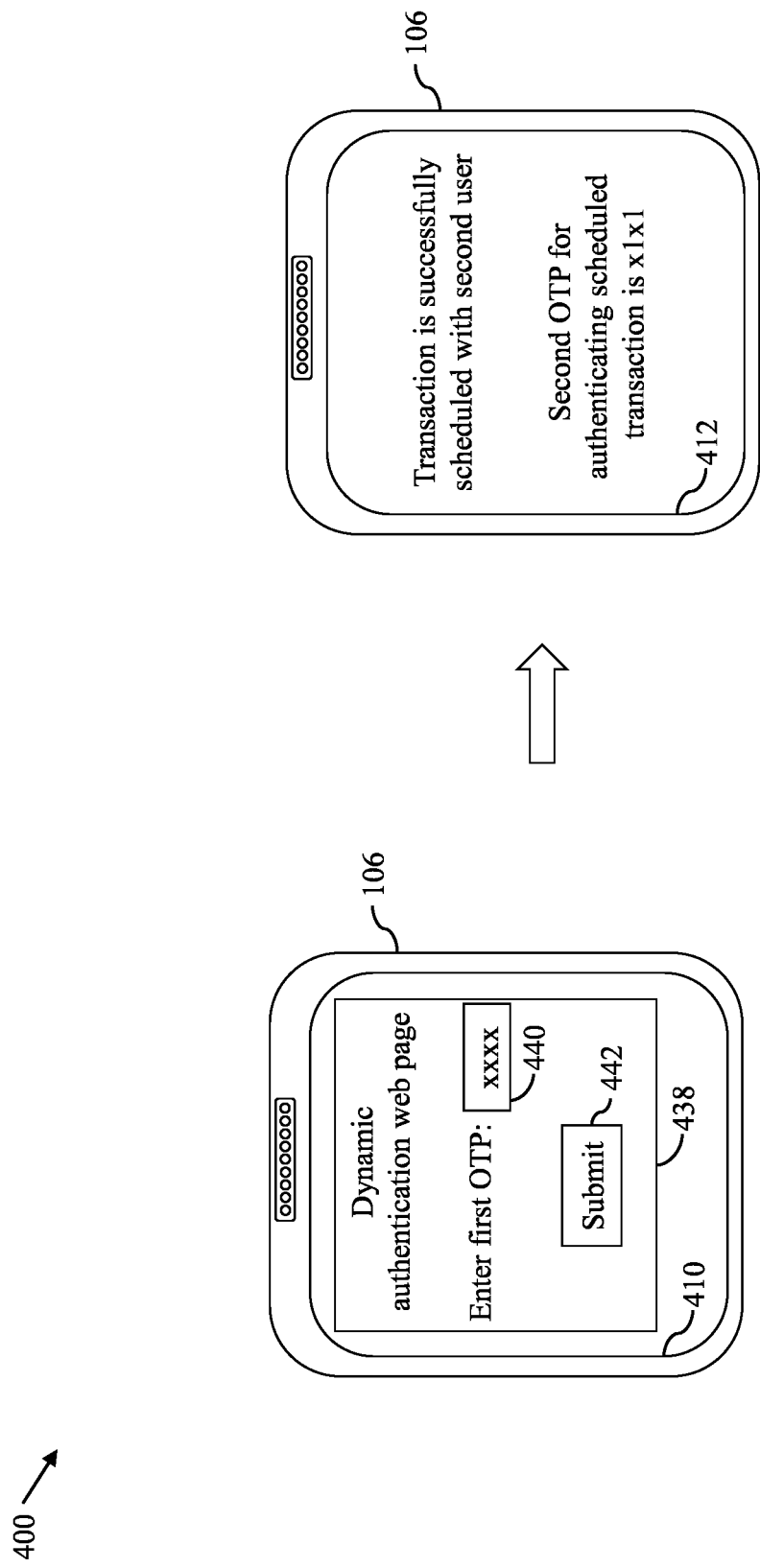

FIGS. 4A and 4B, collectively, represent an exemplary scenario 400 that illustrates first through sixth user interface (UI) screens 402-412 rendered on the first user device 106 for scheduling a payment transaction between the first and second users 102 and 104, in accordance with an exemplary embodiment of the disclosure.

When the first user 102 interacts with the service application 202 running on the first user device 106, the application server 110 renders the first UI screen 402 on a display of the first user device 106. The first UI screen 402 may include one or more selectable options such as a 'schedule transaction' button 414 or a 'select transaction' button 416. The first UI screen 402 may prompt the first user 102 to select one of the 'schedule transaction' button 414 or the 'select transaction' button 416. The 'schedule transaction' button 414 enables the first user 102 to schedule transactions with other users (for example, the second user 104). The 'select transaction' button 416 enables the first user 102 or the second user 104 to select the scheduled payment transaction from the list of scheduled payment transactions. In correspondence with the ongoing description, it is assumed that the first user 102 selects the 'schedule transaction' button 414 for scheduling the transaction with the second user 104. Based on the selection of the 'schedule transaction' button 414, the application server 110 renders the second UI screen 404 on the display of the first user device 106.

The second UI screen 404 may prompt the first user 102 to search for a merchant and select one of the displayed merchants for scheduling the payment transaction. For the sake of brevity, the list of displayed merchants may include one or more merchants such as first, second, and third merchants that have been shown by the buttons 418, 420, and 422, respectively. The first user 102 may select any one of the buttons 418-422 for scheduling the payment transaction. In one example, the first merchant may correspond to the second user 104. When the first user 102 has to schedule the payment transaction with the second user 104, the first user 102 may select the button 418. Based on the selection of the first merchant (i.e., the second user 104 shown by the button 418), the application server 110 renders the third UI screen 406 on the display of the first user device 106.

The third UI screen 406 may prompt the first user 102 to select one of a 'real-time transaction' button 424 or a 'recurring transaction' button 426. The 'real-time transaction' button 424 enables the first user 102 to schedule the payment transaction with the first merchant in real-time. The 'recurring transaction' button 426 enables the first user 102 to schedule a recurring payment transaction (for example, a daily transaction) with the first merchant. In a non-limiting example, it is assumed that the first user 102 wants to schedule the daily transaction and hence selects the 'recurring transaction' button 426. Based on the selection of the 'recurring transaction' button 426, the application server 110 renders the fourth UI screen 408 on the display of the first user device 106.

The fourth UI screen 408 may prompt the first user 102 to enter a transaction amount for scheduling the payment transaction. The fourth UI screen 408 may include a first input box 428 to enter the transaction amount for scheduling the payment transaction. The fourth UI screen 408 may further prompt the first user 102 to enter a time interval for scheduling the payment transaction. The fourth UI screen 408 may include a second input box 430 to enter the time interval for scheduling the payment transaction. The fourth UI screen 408 may further prompt the first user 102 to select the date interval for scheduling the payment transaction. The fourth UI screen 408 may include third and fourth input boxes 432 and 434 to enter the date interval for scheduling the payment transaction. For example, the first user 102 may want to schedule the payment transaction for 31 days from 01/01/2019 to 01/31/2019. In such a case, the first user 102 may enter a start date as 01/01/2019 in the third input box 432 and an end date as 01/31/2019 in the fourth input box 434. The fourth UI screen 408 may further include a first submit button 436. When the first user 102 selects the first submit button 436, the transaction scheduling request is generated and communicated to the application server 110 by the service application 202 running on the first user device 106. Based on the transaction scheduling request, the application server 110 generates and communicates the authentication request to the interchange directory server 118. The interchange directory server 118 communicates the authentication request to the issuer server 112 for authenticating the first user 102. The issuer server 112 may generate and communicate the first one-time password "xxxx" to the first user 102. The issuer server 112 may further generate the dynamic authentication web page for authentication of the first user 102. The dynamic authentication web page may be displayed on the fifth UI screen 410 rendered on the display of the first user device 106.

The fifth UI screen 410 may display the dynamic authentication web page 438 that prompts the first user 102 to enter the first one-time password "xxxx". The fifth UI screen 410 may include a fifth input box 440 for entering the first one-time password "xxxx". The fifth UI screen 410 may further include a second submit button 442. When the first one-time password "xxxx" is entered in the fifth input box 440 and the second submit button 442 is selected by the first user 102, the first one-time password "xxxx" is communicated to the issuer server 112. The issuer server 112 compares the communicated first one-time password "xxxx" with the received first one-time password "xxxx" and generates the authentication response indicating at least the successful or unsuccessful authentication of the first user 102. Based on the successful authentication of the first user 102, the issuer server 112 schedules the payment transaction between the first and second users 102 and 104 corresponding to the transaction scheduling request. When the payment transaction is successfully scheduled between the first and second users 102 and 104, the application server 110 may render the sixth UI screen 412 on the display of the first user device 106. The sixth UI screen 412 may display the first notification. The first notification may be displayed to notify that the payment transaction has been successfully scheduled between the first and second users 102 and 104. Furthermore, the sixth UI screen 412 may also display the second one-time password "x1x1" for authenticating the scheduled payment transaction. The second one-time password "x1x1" for authenticating the scheduled payment transaction may be displayed upon successfully scheduling the payment transaction from the first payment account to the second payment account. In case of recurring payment transactions, a unique second one-time password is generated and communicated to the first user 102 prior to each scheduled recurring payment transaction.

Figure 5:
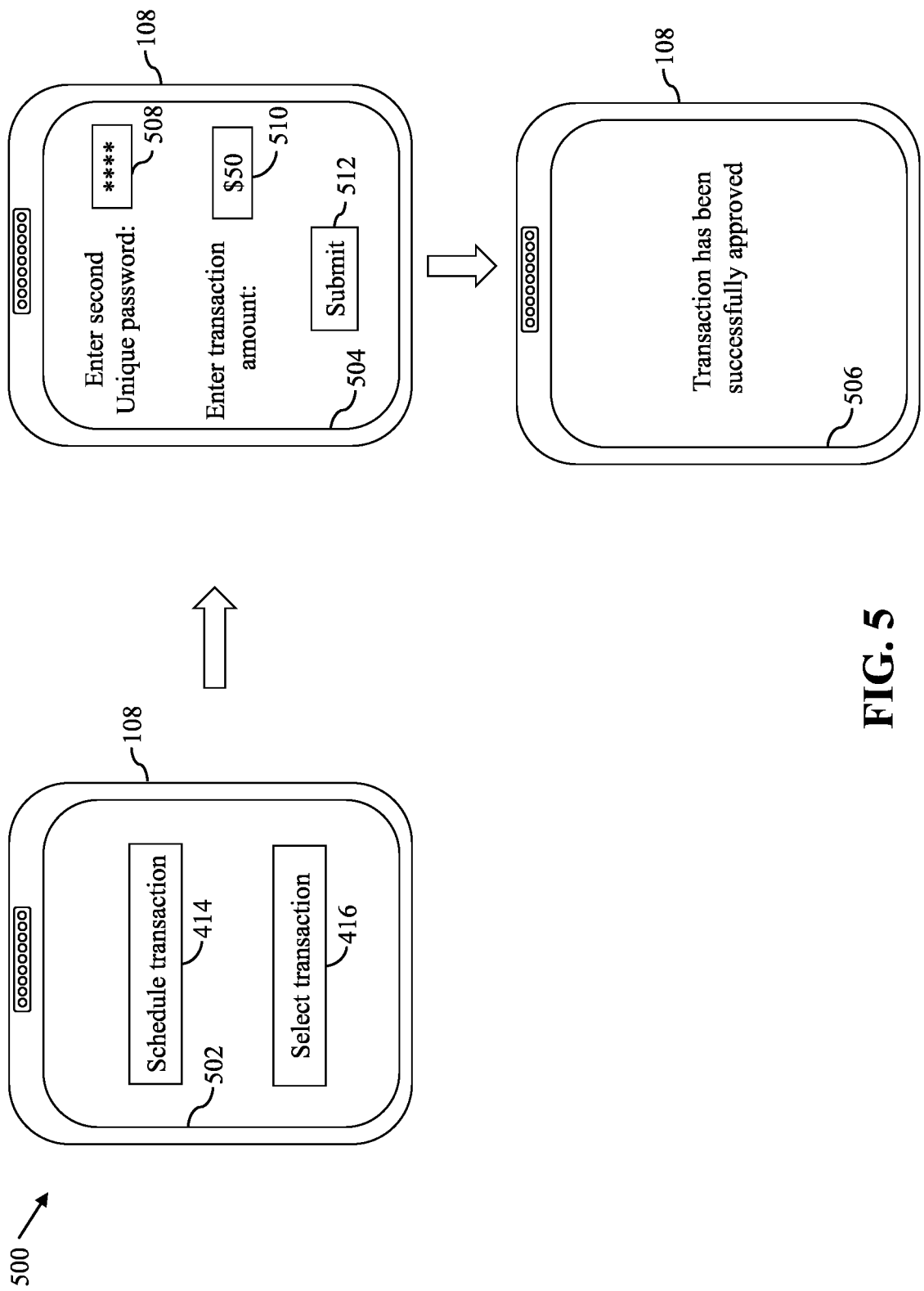
FIG. 5 represents an exemplary scenario that illustrates UI screens rendered on a second user device of FIG. 1 for processing a scheduled payment transaction, in accordance with an exemplary embodiment of the disclosure.

FIG. 5, represents an exemplary scenario 500 that illustrates seventh through ninth user interface (UI) screens 502-506 rendered on the second user device 108 for processing the scheduled payment transaction between the first and second users 102 and 104, in accordance with an exemplary embodiment of the disclosure.

When the second user 104 (or the first user 102 in some cases like self-checkout desk) interacts with the service application 202 running on the second user device 108, the application server 110 renders the seventh UI screen 502 on a display of the second user device 108. The seventh UI screen 502 may include one or more selectable options such as the 'schedule transaction' button 414 or the 'select transaction' button 416. The seventh UI screen 502 may prompt the second user 104 to select one of the 'schedule transaction' button 414 or the 'select transaction' button 416. When the first user 102 or the second user 104 has to initiate the scheduled payment transaction, the first user 102 or the second user 104 selects the 'select transaction' button 416. The 'select transaction' button 416 enables the first user 102 or the second user 104 to select or search for the scheduled payment transaction from the list of scheduled payment transactions. After selecting or searching the scheduled payment transaction from the list of scheduled payment transactions, the application server 110 renders the eighth UI screen 504 on the display of the second user device 108.

The eighth UI screen 504 may prompt the first user 102 or the second user 104 to enter the second one-time password "x1x1" for authenticating and initiating the scheduled payment transaction between the first and second users 102 and 104. The eighth UI screen 504 may display a sixth input box 508 for entering the second one-time password "x1x1" for authenticating and initiating the scheduled payment transaction. The fourth UI screen 408 may further prompt the first user 102 or the second user 104 to enter the first transaction amount. The eighth UI screen 504 may display a seventh input box 510 to enter the first transaction amount that is less than or equal to the scheduled transaction amount. The eighth UI screen 504 may further display a third submit button 512 that is selectable by the first user 102 or the second user 104. When the first user 102 or the second user 104 enters the second one-time password and the first transaction amount and selects the third submit button 512, the payment transaction request is generated and communicated to the application server 110 by the service application 202 running on the second user device 108. The issuer server 112 processes the scheduled payment transaction based on the payment transaction request (as described in FIGS. 3A and 3B). The issuer server 112 further generates and communicates the transaction response to the application server 110. Based on the transaction response, the application server 110 renders the ninth UI screen 506 for displaying whether the transaction is approved or declined. As shown in FIG. 5, the ninth UI screen 506 displays a message that the payment transaction has been successfully approved.

Figure 6:
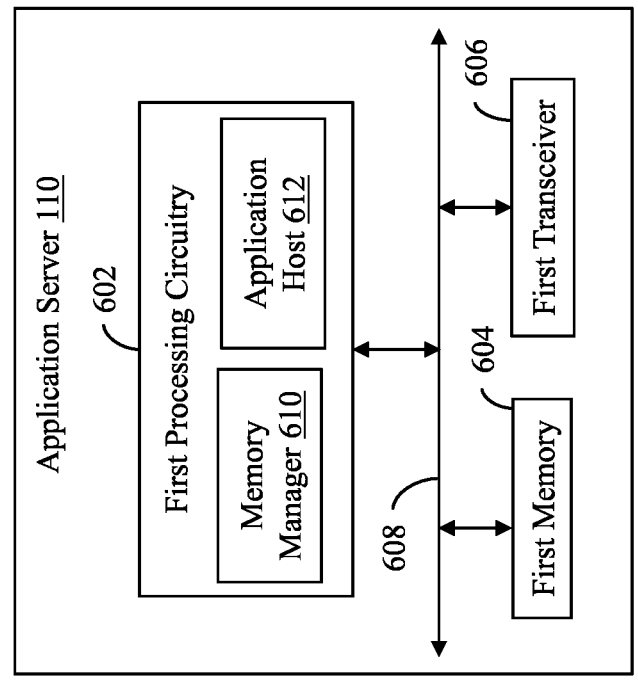
FIG. 6 is a block diagram that illustrates an application server of FIG. 1, in accordance with an exemplary embodiment of the disclosure.

FIG. 6 is a block diagram that illustrates the application server 110, in accordance with an exemplary embodiment of the disclosure. The application server 110 includes first processing circuitry 602, a first memory 604, and a first transceiver 606. The first processing circuitry 602, the first memory 604, and the first transceiver 606 communicate with each other by way of a first communication bus 608.

The first processing circuitry 602 includes suitable logic, circuitry, interfaces, and/or code, executable by the circuitry, for initiating the scheduled payment transaction between the various users such as the first and second users 102 and 104. Examples of the first processing circuitry 602 may include, but are not limited to, an application specific integrated circuit (ASIC) processor, a reduced instruction set computer (RISC) processor, a complex instruction set computer (CISC) processor, a field programmable gate array (FPGA), or the like. The first processing circuitry 602 may include a memory manager 610 and an application host 612.

The memory manager 610 may be configured to manage the first memory 604 of the application server 110. The memory manager 610 may be configured to store, in the first memory 604, the registration details of the registered users. For example, the memory manager 610 stores the registration details of the first and second users 102 and 104. The memory manager 610 may be further configured to execute various memory management operations (such as, storing data, updating stored data, or deleting the stored data) for managing the first memory 604. The memory manager 610 may be further configured to extract the account details of the first payment account to identify the issuer (e.g., the issuer server 112) associated with the first payment account of the first user 102.

The application host 612 may be configured to host the service application 202 that is executable on various user devices, such as the first and second user devices 106 and 108. By way of the service application 202, the application host 612 allows the first and second users 102 and 104 to register with the application server 110 for scheduling the payment transactions. The application host 612 further allows the first and second users 102 and 104 to initiate the scheduled payment transactions using the service application 202.

The first memory 604 includes suitable logic, circuitry, interfaces, and/or code, executable by the circuitry, for storing the registration details of the registered users (for example, the first and second users 102 and 104). Examples of the first memory 604 may include, but are not limited to, a random-access memory (RAM), a read-only memory (ROM), a removable storage drive, a hard-disk drive (HDD), a flash memory, a solid-state memory, or the like. It will be apparent to a person of ordinary skill in the art that the scope of the disclosure is not limited to realizing the first memory 604 in the application server 110, as described herein. In another embodiment, the first memory 604 may be realized in form of a database server or a cloud storage working in conjunction with the application server 110, without departing from the scope of the disclosure.

The first transceiver 606 includes suitable logic, circuitry, interfaces and/or code, executable by the circuitry, for transmitting and receiving data over the communication network 120 using one or more communication protocols. The first transceiver 606 transmits various requests and messages to the first and second user devices 106 and 108, the issuer server 112, the acquirer server 114, and the interchange directory server 118. For example, the first transceiver 606 may transmit the first notification to the first user device 106 and the second notification to the second user device 108. The first transceiver 606 may transmit the authentication and verification requests to the interchange directory server 118. The first transceiver 606 may further transmit the transaction scheduling request and the payment transaction request to the acquirer server 114. The first transceiver 606 further receives various requests and messages from the first and second user devices 106 and 108, the issuer server 112, the acquirer server 114, and the interchange directory server 118. For example, the first transceiver 606 may receive the transaction scheduling request from the first user device 106. The first transceiver 606 may receive the payment transaction request from the second user device 108. The first transceiver 606 may further receive the authentication response and the verification response from the interchange directory server 118. The first transceiver 606 may further receive the transaction scheduling response and the transaction response from the acquirer server 114. Examples of the first transceiver 606 may include, but are not limited to, an antenna, a radio frequency transceiver, a wireless transceiver, a Bluetooth transceiver, an Ethernet port, a universal serial bus (USB) port, or any other device configured to transmit and receive data.

Figure 7:
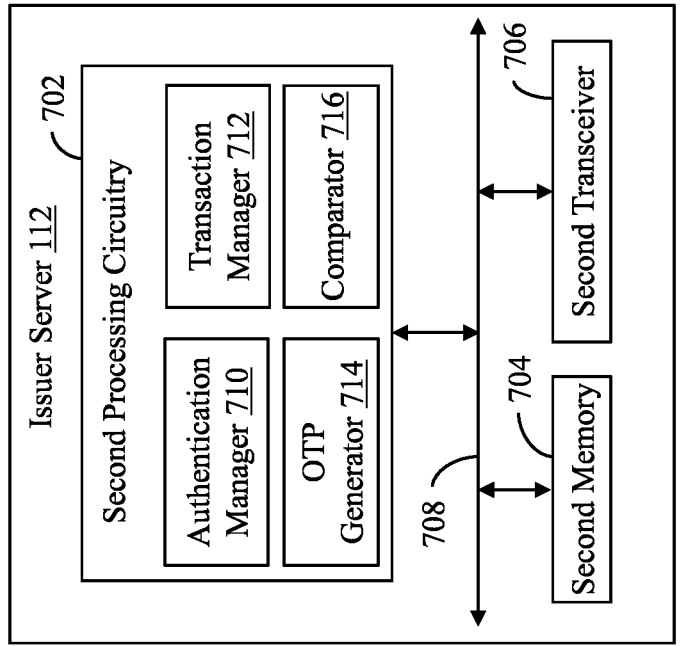
FIG. 7 is a block diagram that illustrates an issuer server of FIG. 1, in accordance with an exemplary embodiment of the disclosure.

FIG. 7 is a block diagram that illustrates the issuer server 112, in accordance with an exemplary embodiment of the disclosure. The issuer server 112 includes second processing circuitry 702, a second memory 704, and a second transceiver 706. The second processing circuitry 702, the second memory 704, and the second transceiver 706 communicate with each other by way of a second communication bus 708.

The second processing circuitry 702 includes suitable logic, circuitry, interfaces, and/or code, executable by the circuitry, for initiating the scheduled payment transactions. Examples of the second processing circuitry 702 may include, but are not limited to, an ASIC processor, a RISC processor, a CISC processor, an FPGA, or the like. The second processing circuitry 702 may include an authentication manager 710, a transaction manager 712, a one-time password (OTP) generator 714, and a comparator 716.

The authentication manager 710 may be configured to authenticate users (for example, the first user 102). The authentication manager 710 may be configured to generate the dynamic authentication web page for authenticating the first user 102.

The transaction manager 712 may be configured to perform one or more operations, as known to those skilled in the art, for processing the payment transaction request corresponding to the scheduled payment transactions between the first user 102 and the second user 104 for the one or more future time intervals. For example, the transaction manager 712 debits the first transaction amount from the first payment account of the first user 102 when the scheduled payment transaction is successfully completed. The transaction manager 712 may be further configured to generate the transaction response indicating successful or unsuccessful processing of the scheduled payment transaction. The transaction manager 712 may be further configured to generate credit or debit acknowledgements when the first payment account of the first user 102 is credited or debited, respectively.

The OTP generator 714 may be configured to generate one-time passwords for authenticating the users (e.g., the first user 102) and initiating the transactions. For example, the OTP generator 714 generates the first one-time password for authenticating the first user 102. The OTP generator 714 generates the second one-time password for initiating the scheduled payment transaction between the first and second users 102 and 104. The OTP generator 714 is further configured to restrict the use of the generated one-time passwords for one session i.e., the generated one-time passwords are valid for a defined time period.

The comparator 716 may be configured to compare the received first and second one-time passwords with the communicated first and second one-time passwords, respectively. The comparator 716 may utilize one or more comparison algorithms known in the art for the comparison.

The second memory 704 includes suitable logic, circuitry, interfaces, and/or code, executable by the circuitry, for storing the account profiles of various payment accounts that are maintained at the issuer server 112. Examples of the second memory 704 may include, but are not limited to, a RAM, a ROM, a removable storage drive, a HDD, a flash memory, a solid-state memory, or the like. It will be apparent to a person of ordinary skill in the art that the scope of the disclosure is not limited to realizing the second memory 704 in the issuer server 112, as described herein. In another embodiment, the second memory 704 may be realized in form of a database server or a cloud storage working in conjunction with the issuer server 112, without departing from the scope of the disclosure.

The second transceiver 706 includes suitable logic, circuitry, interfaces and/or code, executable by the circuitry, for transmitting and receiving data over the communication network 120 using one or more communication protocols. The second transceiver 706 may transmit various requests and messages to the first and second user devices 106 and 108, the application server 110, the acquirer server 114, the payment network server 116, and the interchange directory server 118. For example, the second transceiver 706 may transmit the first notification to the first user device 106 and the second notification to the second user device 108. The second transceiver 706 may transmit the authentication response and the verification response to the interchange directory server 118. The second transceiver 706 may transmit the transaction scheduling response and the transaction response to the payment network server 116. The second transceiver 706 may receive various requests and messages from the first and second user devices 106 and 108, the application server 110, the acquirer server 114, the payment network server 116, and the interchange directory server 118. For example, the second transceiver 706 may receive the authentication request and the verification request from the interchange directory server 118. The second transceiver 706 may further receive the transaction scheduling request from the application server 110. The second transceiver 706 may receive the payment transaction request from the application server 110. Examples of the second transceiver 706 may include, but are not limited to, an antenna, a radio frequency transceiver, a wireless transceiver, a Bluetooth transceiver, an Ethernet port, a universal serial bus (USB) port, or any other device configured to transmit and receive data.

Figure 8:
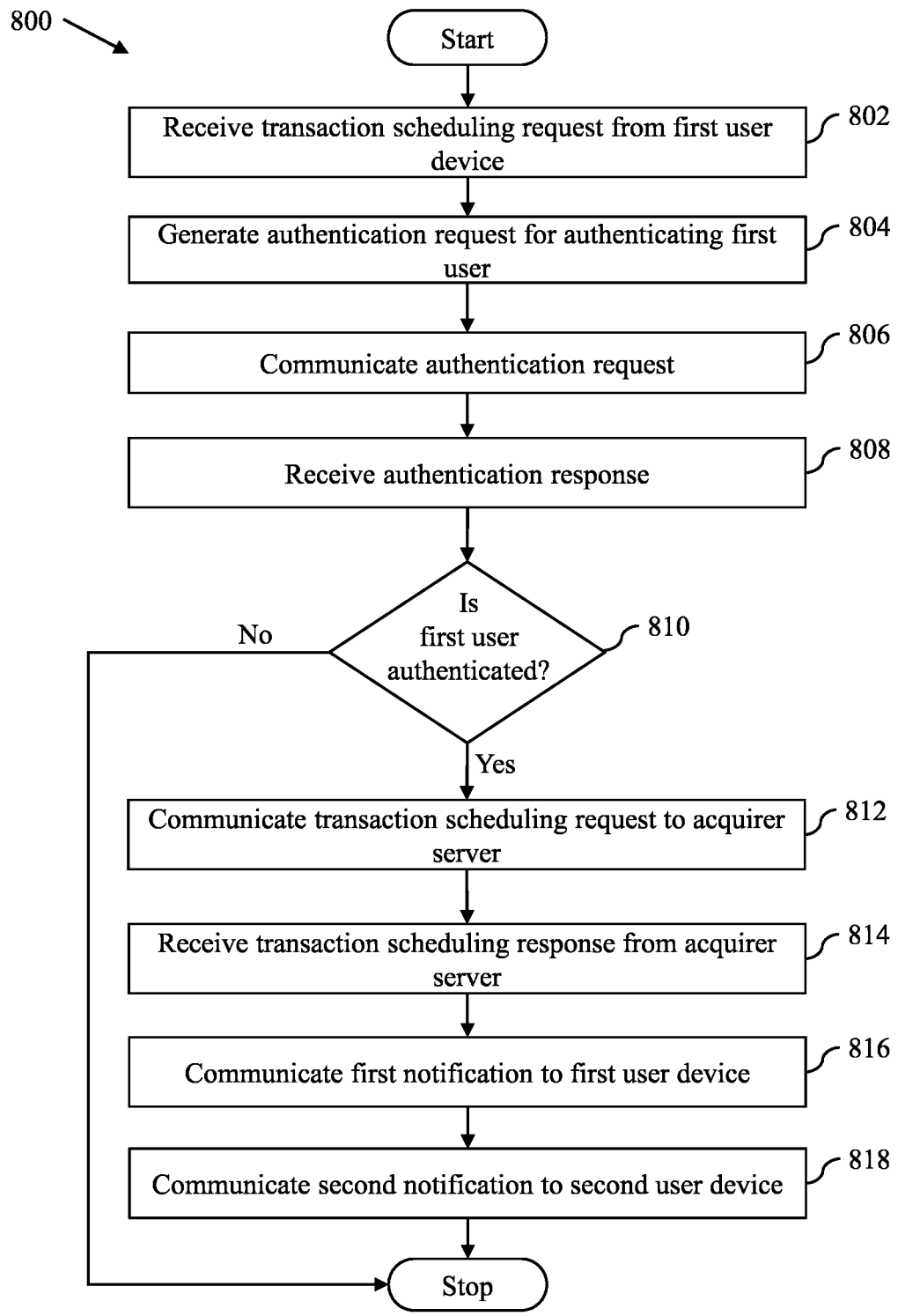
FIG. 8 represents a flow chart that illustrates a method for scheduling a payment transaction, in accordance with an exemplary embodiment of the disclosure.

FIG. 8 represents a flow chart 800 that illustrates a method for scheduling a payment transaction between the first and second users 102 and 104, in accordance with an exemplary embodiment of the disclosure. The first user 102 may utilize the service application 202 running on the first user device 106 for initiating a request for scheduling the payment transaction with the second user 104.

At step 802, the application server 110 receives the transaction scheduling request at the first time instance through the service application 202 running on the first user device 106. The transaction scheduling request may be received for scheduling the payment transaction from the first payment account associated with the first user 102 to the second payment account associated with the second user 104. The payment transaction may be scheduled for the second time instance occurs at a later time than the first time instance. At step 804, the application server 110 generates the authentication request, for authenticating the first user 102, based on the transaction scheduling request. At step 806, the application server 110 communicates the authentication request. The application server 110 may communicate the authentication request to the issuer server 112 by way of the interchange directory server 118. The issuer server 112 may authenticate the first user 102 and generate the authentication response indicating the authentication of the first user 102 (as described in the foregoing description of FIGS. 2A and 2B).

At step 808, the application server 110 receives the authentication response. The application server 110 may receive the authentication response from the issuer server 112 by way of the interchange directory server 118. At step 810, the application server 110 determines whether the first user 102 is successfully authenticated or not. If at step 810, it is determined that the first user 102 has been successfully authenticated, step 812 is performed. At step 812, the application server 110 communicates the transaction scheduling request to the acquirer server 114. The acquirer server 114 communicates the transaction scheduling request to the payment network server 116. The payment network server 116 communicates the transaction scheduling request to the issuer server 112. The issuer server 112 schedules the payment transaction between the first and second users 102 and 104 based on the transaction scheduling request. The issuer server 112 generates the transaction scheduling response based on the transaction scheduling request and communicates the transaction scheduling response to the payment network server 116. The payment network server 116 communicates the transaction scheduling response to the acquirer server 114. The acquirer server 114 communicates the transaction scheduling response to the application server 110.

At step 814, the application server 110 receives the transaction scheduling response from the acquirer server 114. Based on the transaction scheduling response, the application server 110 is notified whether the payment transaction is successfully scheduled or not. At step 816, the application server 110 communicates the first notification to the first user device 106 indicating that the payment transaction is successfully scheduled between the first and second users 102 and 104. At step 818, the application server 110 communicates the second notification to the second user device 108 indicating that the first user 102 has scheduled the payment transaction with the second user 104. If at step 810, it is determined that the authentication of the first user 102 was not successful, the process stops.

Figure 9:
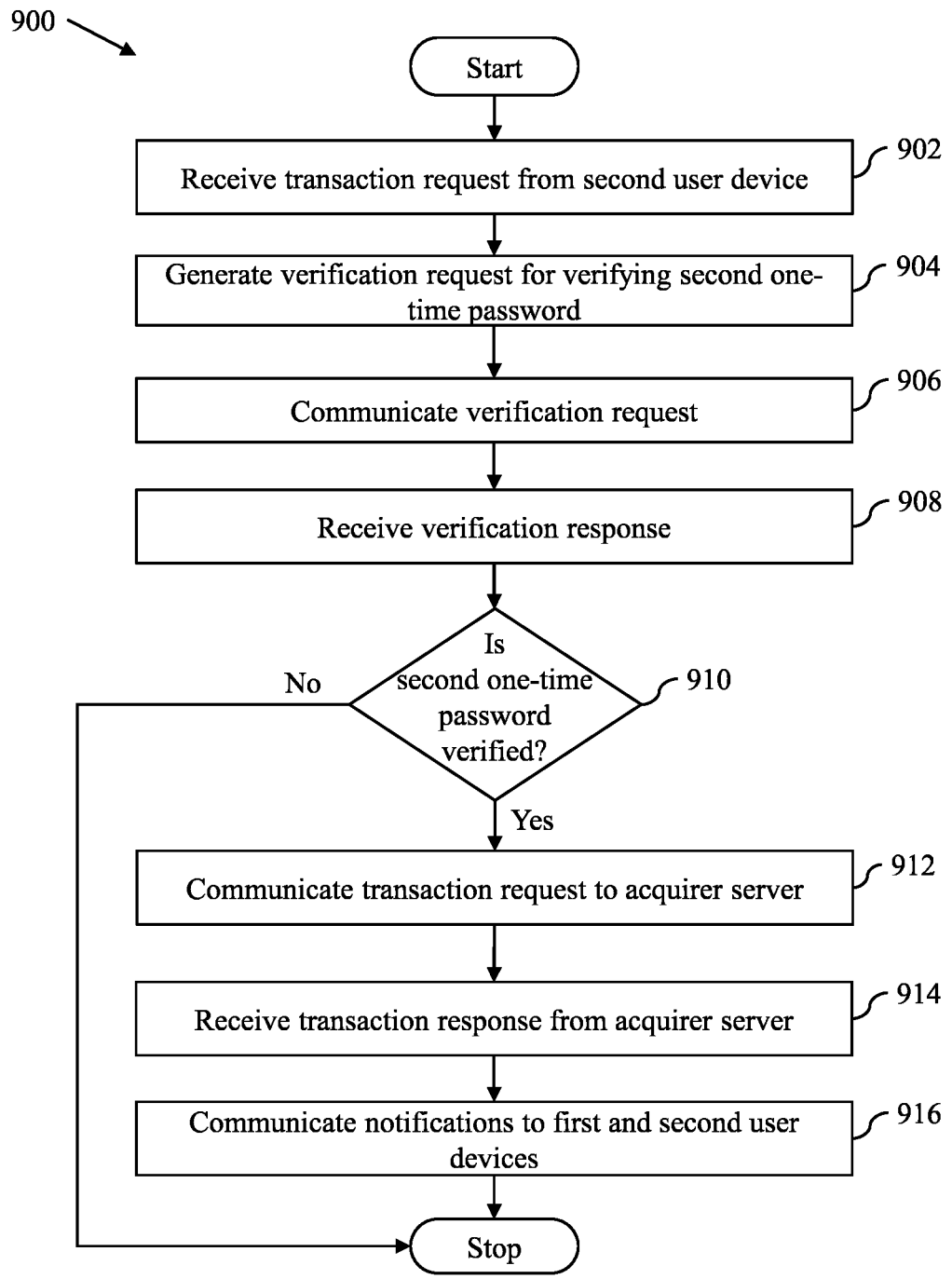
FIG. 9 represents a flow chart that illustrates a method for processing a scheduled payment transaction, in accordance with an exemplary embodiment of the disclosure.

FIG. 9 represents a flow chart 900 that illustrates a method for processing the scheduled payment transactions, in accordance with an exemplary embodiment of the disclosure. The first user 102 may request the second user 104 to initiate the scheduled payment transaction at the second time instance. The first user 102 may provide the second one-time password (received from the issuer server 112) for initiating the scheduled payment transaction between the first and second users 102 and 104. Alternatively, the first user 102 may initiate the scheduled payment transaction at the second time instance. The first user 102 or the second user 104 may utilize the service application 202 running on the second user device 108 for initiating the scheduled payment transaction. The first user 102 or second user 104 may utilize the service application 202 running on the second user device 108 to enter the second one-time password and the first transaction amount for initiating the scheduled payment transaction. The service application 202 communicates the payment transaction request to the application server 110 for processing the scheduled payment transaction.

At step 902, the application server 110 receives the payment transaction request from the second user device 108 of the second user 104. At step 904, the application server 110 generates the verification request for verifying the second one-time password of the first user 102 based on the payment transaction request. The verification request includes at least the second one-time password entered by the second user 104. At step 906, the application server 110 communicates the verification request. The application server 110 may communicate the verification request to the issuer server 112 by way of the interchange directory server 118. The issuer server 112 may verify the second one-time password and generate the verification response corresponding to the verification request. The issuer server 112 communicates the verification response to the application server 110 by way of the interchange directory server 118.

At step 908, the application server 110 receives the verification response. The application server 110 may receive the verification response from the issuer server 112 by way of the interchange directory server 118. At step 910, the application server 110 determines whether the second one-time password of the first user 102 is successfully verified or not. If at step 910, it is determined that the second one-time password has been successfully verified, step 912 is performed. At step 912, the application server 110 communicates the payment transaction request to the acquirer server 114. The acquirer server 114 communicates the payment transaction request to the payment network server 116. The payment network server 116 communicates the payment transaction request to the issuer server 112. Based on the payment transaction request, the issuer server 112 processes the payment transaction request corresponding to the scheduled payment transaction between the first user 102 and the second user 104. The issuer server 112 generates the transaction response based on the transaction request and communicates the transaction response to the payment network server 116. The payment network server 116 communicates the transaction response to the acquirer server 114. The acquirer server 114 communicates the transaction response to the application server 110.

At step 914, the application server 110 receives the transaction response from the acquirer server 114. Based on the transaction response, the application server 110 is notified whether the scheduled payment transaction is successful or not. At step 916, the application server 110 communicates the third and fourth notifications to the first and second user devices 106 and 108, respectively. The third and fourth notifications may indicate whether the scheduled payment transaction has been approved or declined based on processing of the payment transaction request by the issuer server 112. If at step 910, it is determined that the second one-time password was not successfully verified, the process stops.

Figure 10:
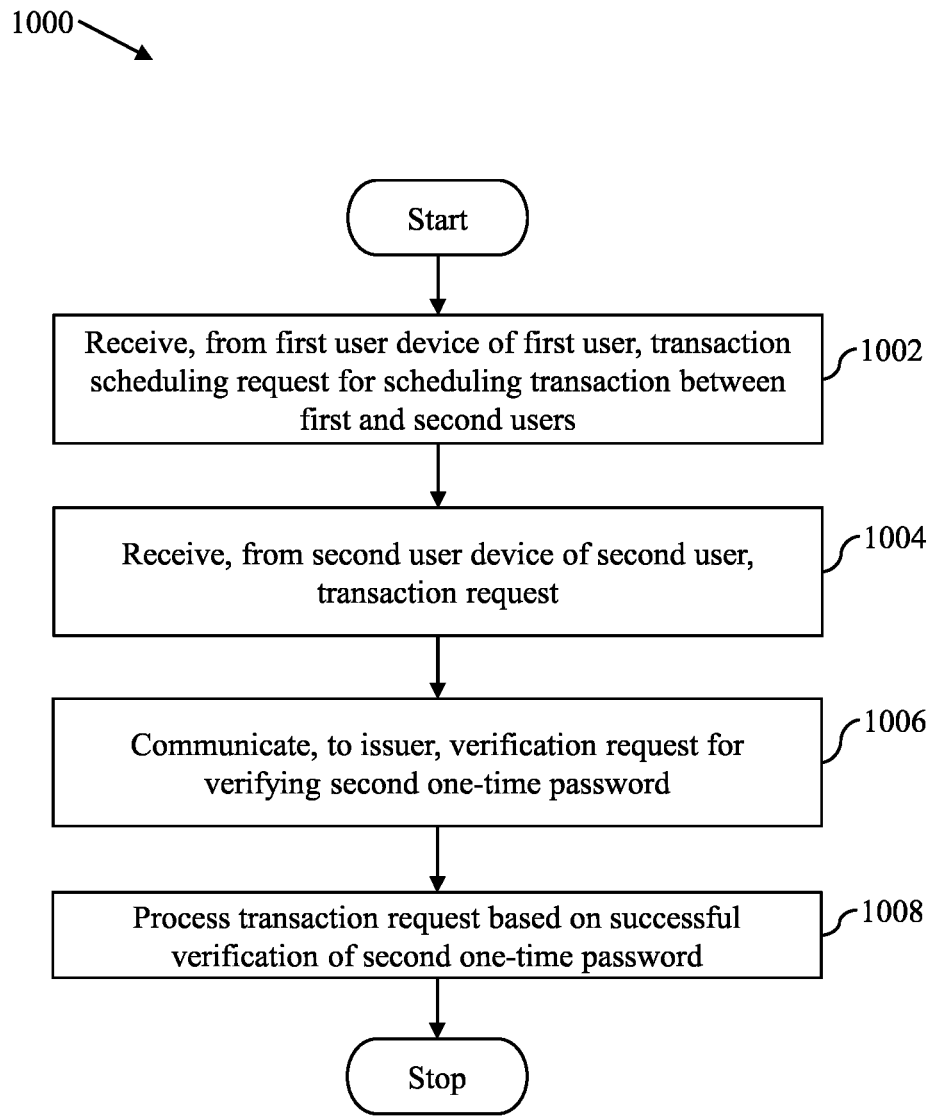
FIG. 10 represents a high-level flow chart that illustrates a method for facilitating payment transactions, in accordance with an exemplary embodiment of the disclosure.

FIG. 10 represents a high-level flow chart 1000 that illustrates a method for facilitating payment transactions, in accordance with an exemplary embodiment of the disclosure. At step 1002, the application server 110 receives the transaction scheduling request from the first user device 106 of the first user 102 for scheduling the payment transaction between the first and second users 102 and 104. The payment transaction may be scheduled for the one or more future time intervals, as requested by the first user 102. The transaction scheduling request may be received for scheduling the payment transaction from the first payment account associated with the first user 102 to the second payment account associated with the second user 104. The payment transaction may be scheduled for the second time instance occurs at a later time than the first time instance. Based on the successful processing of the transaction scheduling request, the issuer server 112 communicates the second one-time password to the first user 102 for initiating the scheduled payment transaction.

At step 1004, the application server 110 receives, from the second user device 108 of the second user 104, the payment transaction request corresponding to the scheduled payment transaction at the second time instance. The payment transaction request includes at least the second one-time password. At step 1006, the application server 110 communicates the verification request to the issuer server 112 for verifying the second one-time password. At step 1008, the application server 110 further processes the payment transaction request based on the successful verification of the second one-time password by the issuer server 112.

Figure 11:
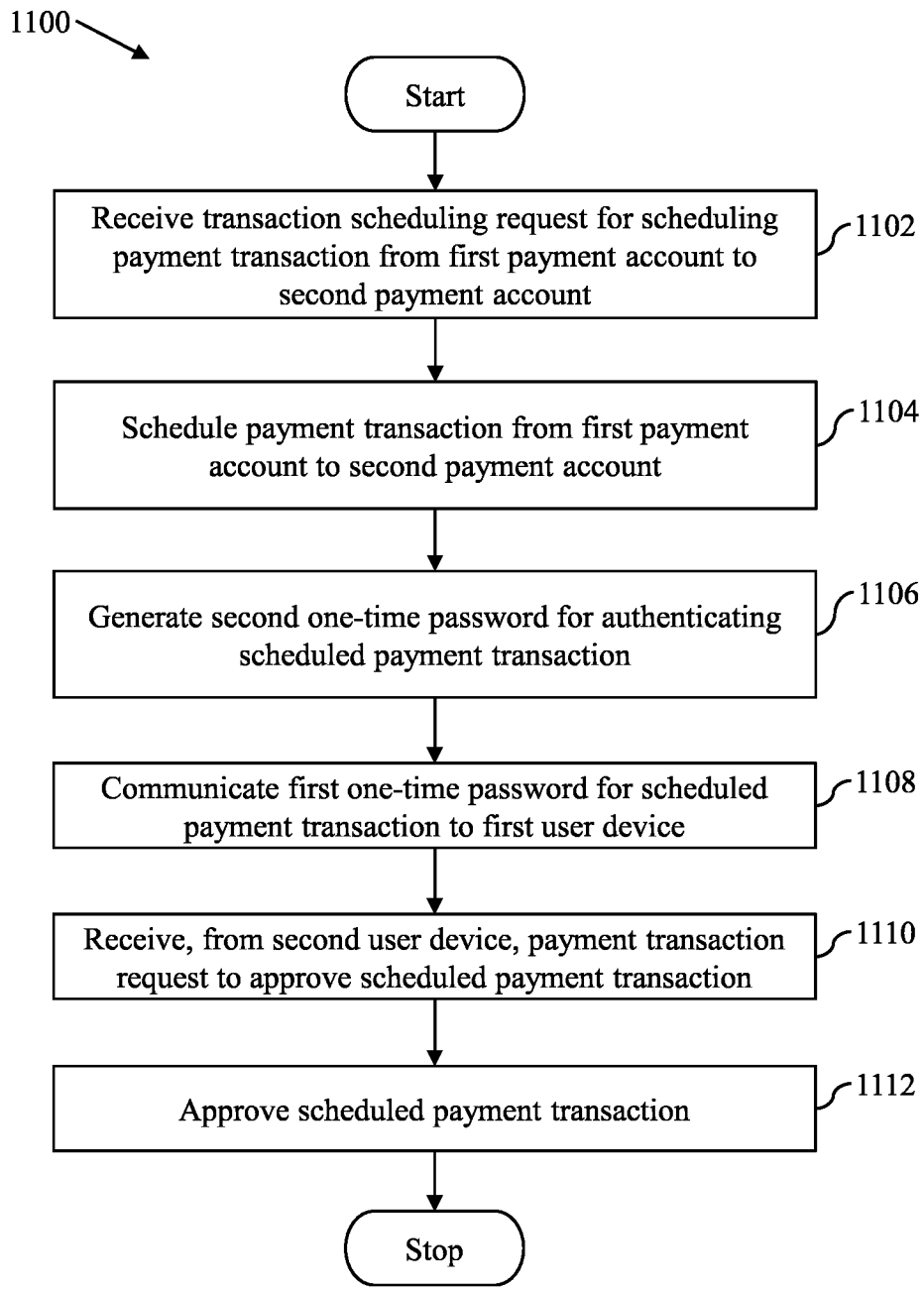
FIG. 11 represents a high-level flow chart that illustrates a method for facilitating payment transactions, in accordance with an exemplary embodiment of the disclosure.

FIG. 11 represents a high-level flow chart that illustrates a method for facilitating payment transactions, in accordance with an exemplary embodiment of the disclosure. At step 1102, the issuer server 112 receives, from the first user device 106 at the first time instance, the transaction scheduling request. The transaction scheduling request may be received for scheduling the payment transaction from the first payment account associated with the first user 102 to the second payment account associated with the second user 104. The payment transaction may be scheduled for the second time instance that occurs at a later time than the first time instance.

At step 1104, the issuer server 112 schedules the payment transaction from the first payment account to the second payment account based on successful authentication of the first user 102. The successful authentication of the first user 102 may be performed using a first authentication method. The first authentication method may be executed by the issuer server 112. The first authentication method includes generating the first one-time password for authenticating the first user 102 upon successfully receiving the transaction scheduling request from the first user device 106. The issuer server 112 may be configured to generate the first one-time password for authenticating the first user 102. The first authentication method further includes communicating the first one-time password to the first user device 106. The issuer server 112 may be configured to communicate the first one-time password to the first user device 106. The first authentication method further includes authenticating the first user 102 upon successfully receiving the first one-time password from the first user device 106. The issuer server 112 may be configured to authenticate the first user 102 upon successfully receiving the first one-time password from the first user device 106.

At step 1106, the issuer server 112 generates the second one-time password for authenticating the scheduled payment transaction upon successfully scheduling the payment transaction from the first payment account to the second payment account. At step 1108, the issuer server 112 communicates the second one-time password for the scheduled payment transaction to the first user device 106. At step 1110, the issuer server 112 receives, from the second user device 108 at the second time instance, the payment transaction request to approve the scheduled payment transaction. At step 1112, the issuer server 112 approves the scheduled payment transaction upon successfully receiving the second one-time password from the second user device 108.

Figure 12:
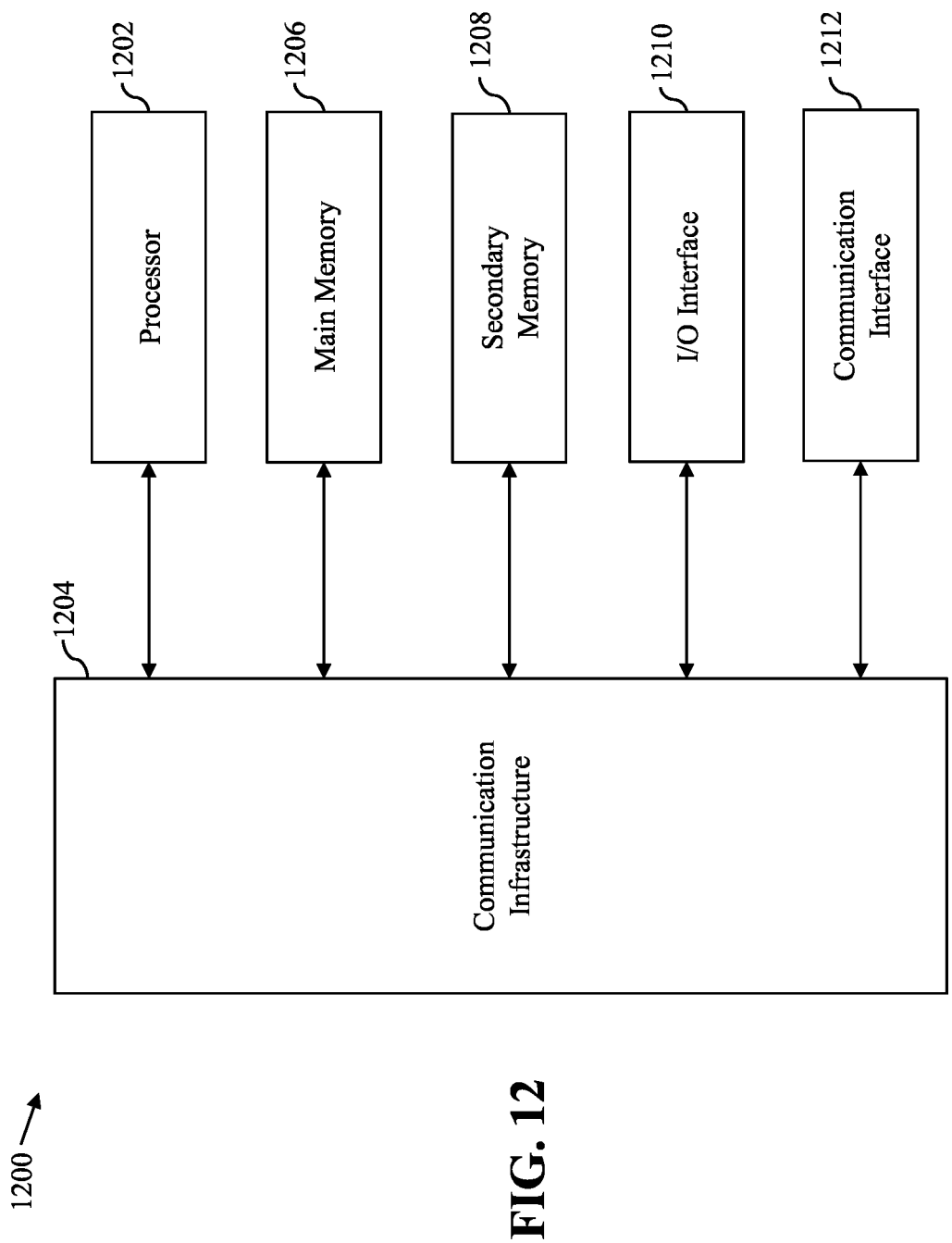
FIG. 12 is a block diagram that illustrates a system architecture of a computer system, in accordance with an exemplary embodiment of the disclosure.

FIG. 12 is a block diagram that illustrates a system architecture of a computer system 1200, in accordance with an exemplary embodiment of the present disclosure. An exemplary embodiment of the present disclosure, or portions thereof, may be implemented as computer readable code on the computer system 1200. In one example, the first and second user devices 106 and 108, the application server 110, the issuer server 112, the acquirer server 114, the payment network server 116, and the interchange directory server 118 of FIG. 1 may be implemented in the computer system 1200. Hardware, software, or any combination thereof may embody modules and components used to implement the methods of FIGS. 8, 9, 10, and 11.

The computer system 1200 includes a processor 1202 that may be a special-purpose or a general-purpose processing device. The processor 1202 may be a single processor, multiple processors, or combinations thereof. The processor 1202 may have one or more processor cores. In one example, the processor 1202 is an octa-core processor. The processor 1202 may be connected to a communication infrastructure 1204, such as a bus, message queue, multi-core message-passing scheme, and the like. The computer system 1200 may further include a main memory 1206 and a secondary memory 1208. Examples of the main memory 1206 may include RAM, ROM, and the like. The secondary memory 1208 may include a hard disk drive or a removable storage drive, such as a floppy disk drive, a magnetic tape drive, a compact disc, an optical disk drive, a flash memory, and the like.

The computer system 1200 further includes an input/output (I/O) interface 1210 and a communication interface 1212. The I/O interface 1210 includes various input and output devices that are configured to communicate with the processor 1202. Examples of the input devices may include a keyboard, a mouse, a joystick, a touchscreen, a microphone, and the like. Examples of the output devices may include a display screen, a speaker, headphones, and the like. The communication interface 1212 may be configured to allow data to be transferred between the computer system 1200 and various devices that are communicatively coupled to the computer system 1200. Examples of the communication interface 1212 may include a modem, a network interface, i.e., an Ethernet card, a communication port, and the like. Data transferred via the communication interface 1212 may correspond to signals, such as electronic, electro-magnetic, optical, or other signals as will be apparent to a person skilled in the art. The signals may travel via a communication channel (not shown) which may be configured to transmit the signals to devices that are communicatively coupled to the computer system 1200. Examples of the communication channel may include, but are not limited to, cable, fiber optics, a phone line, a cellular phone link, a radio frequency link, and the like.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. Further, the operations may be described as a sequential process, however some of the operations may in fact be performed in parallel, concurrently, and/or in a distributed environment by single or multiprocessor machines. In addition, in some embodiments the order of operations may be rearranged without departing from the spirit of the disclosed subject matter.

Thus, various technological improvements in the application server 110 and/or the issuer server 112 may enable the users (for example, the first user 102) to perform seamless and fast payment transactions. By utilizing the service application 202 hosted by the application server 110 and/or the issuer server 112, the first user 102 may schedule one or more payment transactions with the second user 104 for one or more future time intervals. During the scheduling process, the first user 102 may be authenticated using dynamic authentication web page facilitated by the issuer server 112. Thus, the payment transaction is securely scheduled and the processing time of the payment transaction is also decreased. Various methods and systems of present disclosure offers a seamless user experience for carrying out payment transactions, which may encourage users to carry out more cashless transactions.

Techniques consistent with the present disclosure provide, among other features, systems and methods for scheduling payment transactions between various users (such as the first and second users 102 and 104) and processing the scheduled payment transactions for facilitating seamless and fast payment transactions. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

Unless stated otherwise, terms such as "first" and "second" in claims are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage. While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

We claim:

1. A method for facilitating payment transactions, the method at a server comprising:

providing an application operable to present an interactive user interface on a first user device to a first user;

receiving, from the first user device via the interactive user interface at a first time instance, a transaction scheduling request for scheduling a payment transaction from a first payment account associated with a first user to a second payment account associated with a second user, wherein the payment transaction is scheduled for a second time instance, wherein the second time instance occurs at a later time than the first time instance, and wherein, based on successful processing of the transaction scheduling request, a first one-time password for initiating the scheduled payment transaction is communicated to the first user via one or more of the interactive user interface, a registered contact number of the first user, or a registered e-mail identifier of the first user;

generating, after receiving the transaction scheduling request, a dynamic authentication page, wherein the dynamic authentication page is an extended markup language (XML) page comprising a three-domain secure page, and wherein the dynamic authentication page includes an input region for entering the first one-time password and a first interactive icon and prompts the first user to enter the first one-time password into the input region;

presenting, via the interactive user interface, the dynamic authentication page on the first user device;

receiving, via input by the first user into the dynamic authentication page, the first one-time password from the first user device, wherein the first one-time password is received via input into the input region of the dynamic authentication page and activation of the first interactive icon by the first user;

receiving, at the second time instance, a payment transaction request corresponding to the scheduled payment transaction from a second user device associated with the second user, wherein the payment transaction request includes at least the first one-time password;

communicating, to an issuer, a verification request for verifying the first one-time password;

communicating, to the issuer, based on the received transaction scheduling request, an authentication request for authenticating the first user, wherein the issuer authenticates the first user based on a second one-time password;

receiving, from the issuer, an authentication response including an outcome of the authentication of the first user;

communicating, to the issuer, the transaction scheduling request for verification, when the outcome indicates successful authentication of the first user; and processing the payment transaction request based on successful verification of the first one-time password, wherein each of the first one-time password and the second one-time password is session-oriented and remains valid only for a single session.

2. The method of claim 1, wherein the transaction scheduling request includes at least one of a first identifier of the first user, a second identifier of the second user, a scheduled transaction amount of the scheduled payment transaction, or the second time instance for the scheduled payment transaction.

3. The method of claim 1, further comprising receiving, from the issuer, a transaction scheduling response based on the verification of the transaction scheduling request, wherein the transaction scheduling response includes at least successful or unsuccessful verification of the transaction scheduling request.

4. The method of claim 3, wherein the payment transaction is scheduled from the first payment account to the second payment account based on the successful verification of the transaction scheduling request.

5. The method of claim 4, further comprising:
communicating, to the first user device, a first notification based on the successful or unsuccessful verification of the transaction scheduling request, or
communicating, to the second user device, a second notification based on the successful verification of the transaction scheduling request, wherein the second notification is communicated for notifying the second user of the scheduled payment transaction at the second time instance.

6. The method of claim 1, further comprising receiving, from the issuer, a verification response based on the verification of the first one-time password, wherein the verification response includes an outcome of the verification of the first one-time password, and wherein the payment transaction request is processed, when the outcome of the verification indicates the successful verification of the first one-time password.

7. The method of claim 1, wherein a scheduled transaction amount associated with the scheduled payment transaction is blocked in the first payment account of the first user by the issuer, when the first one-time password is communicated to the first user.

8. The method of claim 7, wherein a first transaction amount of the scheduled transaction amount is debited by the issuer from the first payment account and credited to the second payment account based on successful processing of the payment transaction request, and wherein the first transaction amount is less than or equal to the scheduled transaction amount.

9. The method of claim 1, further comprising communicating, to at least one of the first and second user devices, a third notification indicating whether the scheduled payment transaction is approved or declined based on processing of the payment transaction request.

10. A system for facilitating payment transactions, the system comprising:
a server configured to:
provide an application operable to present an interactive user interface on a first user device to a first user;
receive, from the first user device via the interactive user interface at a first time instance, a transaction scheduling request for scheduling a payment transaction from a first payment account associated with a first user to a second payment account associated with a second user, wherein the payment transaction is scheduled for a second time instance, wherein the second time instance occurs at a later time than the first time instance, and wherein, based on successful processing of the transaction scheduling request, a first one-time password for initiating the scheduled payment transaction is communicated to the first user via one or more of the interactive user interface, a registered contact number of the first user, or a registered e-mail identifier of the first user;
generate, after receiving the transaction scheduling request, a dynamic authentication page, wherein the dynamic authentication page is an extended markup language (XML) page comprising a three-domain secure page, and wherein the dynamic authentication page includes an input region for entering the first one-time password and a first interactive icon and prompts the first user to enter the first one-time password into the input region;
present, via the interactive user interface, the dynamic authentication page on the first user device;
receive, via input by the first user into the dynamic authentication page, the first one-time password from the first user device, wherein the first one-time password is received via input into the input region of the dynamic authentication page and activation of the first interactive icon by the first user;
receive, at the second time instance, a payment transaction request corresponding to the scheduled payment transaction from a second user device associated with the second user, wherein the payment transaction request includes at least the first one-time password;
communicate, to an issuer, a verification request for verifying the first one-time password;
communicate, to the issuer, based on the received transaction scheduling request, an authentication request for authenticating the first user, wherein the issuer authenticates the first user based on a second one-time password;
receive, from the issuer, an authentication response including an outcome of the authentication of the first user; and
communicate, to the issuer, the transaction scheduling request for verification, when the outcome indicates successful authentication of the first user; and
process the payment transaction request based on successful verification of the first one-time password, wherein each of the first one-time password and the second one-time password is session-oriented and remains valid only for a single session.

11. The system of claim 10, wherein the transaction scheduling request includes at least one of a first identifier of the first user, a second identifier of the second user, a scheduled transaction amount of the scheduled payment transaction, or the second time instance for the scheduled payment transaction.

12. The system of claim 10, wherein the server is further configured to:
receive, from the issuer, a transaction scheduling response based on the verification of the transaction scheduling request, wherein the transaction scheduling response includes at least successful or unsuccessful verification of the transaction scheduling request; and
communicate, to the first user device, a first notification based on the successful or unsuccessful verification of the transaction scheduling request, or
communicate, to the second user device, a second notification based on the successful
verification of the transaction scheduling request, wherein the second notification is communicated for notifying the second user of the scheduled payment transaction at the second time instance.

13. The system of claim 10, wherein the server is further configured to receive, from the issuer, a verification response based on the verification of the first one-time password, wherein the verification response includes an outcome of the verification of the first one-time password, and wherein the payment transaction request is processed, when the outcome of the verification indicates the successful verification of the first one-time password.

14. The system of claim 10, wherein a scheduled transaction amount associated with the scheduled payment transaction is blocked in the first payment account of the first user by the issuer, when the first one-time password is communicated to the first user.

15. The system of claim 14, wherein a first transaction amount of the scheduled transaction amount is debited by the issuer from the first payment account and credited to the second payment account based on successful processing of the payment transaction request, and wherein the first transaction amount is less than or equal to the scheduled transaction amount.

16. The method of claim 1, further comprising:
presenting, via the interactive user interface, a first screen with a first second interactive icon prompting the first user to select a transaction scheduling option;
receiving a selection of the transaction scheduling option provided by the first user via the second interactive icon;
presenting, via the interactive user interface, a second screen with a third interactive icon prompting the first user to select the second user;
receiving a selection of the second user provided by the first user via activation of the third interactive icon;
presenting, via the interactive user interface, a third screen with a fourth interactive icon prompting the first user to select a transaction type;
receiving a selection of the transaction type provided by the first user via activation of the fourth interactive icon; and
presenting, via the interactive user interface, a fourth screen with a fifth interactive icon prompting the first user to enter information about the transaction and submit the transaction scheduling request;
wherein the transaction scheduling request is received from the first user via activation of the fifth interactive icon.

17. The system of claim 10, wherein the server is further configured to:
present, via the interactive user interface, a first screen with a second interactive icon prompting the first user to select a transaction scheduling option;
receive a selection of the transaction scheduling option provided by the first user via the second interactive icon;
present, via the interactive user interface, a second screen with a third interactive icon prompting the first user to select the second user;
receive a selection of the second user provided by the first user via activation of the third interactive icon;
present, via the interactive user interface, a third screen with a fourth interactive icon prompting the first user to select a transaction type;
receive a selection of the transaction type provided by the first user via activation of the fourth interactive icon; and
present, via the interactive user interface, a fourth screen with a fifth interactive icon prompting the first user to enter information about the transaction and submit the transaction scheduling request;
wherein the transaction scheduling request is received from the first user via activation of the fifth interactive icon.

* * * * *